(12) United States Patent
Bentfeld

(10) Patent No.: US 12,176,835 B2
(45) Date of Patent: Dec. 24, 2024

(54) METHOD FOR OPERATING A PLANAR DRIVE SYSTEM AND PLANAR DRIVE SYSTEM

(71) Applicant: Beckhoff Automation GmbH, Verl (DE)

(72) Inventor: Lukas Bentfeld, Delbrück (DE)

(73) Assignee: Beckhoff Automation GmbH, Verl (DE)

( * ) Notice: Subject to any disclaimer, the term of this patent is extended or adjusted under 35 U.S.C. 154(b) by 211 days.

(21) Appl. No.: 18/060,535

(22) Filed: Nov. 30, 2022

(65) Prior Publication Data

US 2023/0100474 A1  Mar. 30, 2023

Related U.S. Application Data

(63) Continuation of application No. PCT/EP2021/066059, filed on Jun. 15, 2021.

(30) Foreign Application Priority Data

Jun. 18, 2020  (EP) ..................................... 20180860

(51) Int. Cl.
*H02K 41/00* (2006.01)
*H02K 41/03* (2006.01)
(Continued)

(52) U.S. Cl.
CPC ......... *H02P 25/064* (2016.02); *H02K 41/031* (2013.01); *H02K 2201/18* (2013.01)

(58) Field of Classification Search
CPC ...... H02P 21/18; H02P 25/064; H02K 41/031
(Continued)

(56) References Cited

U.S. PATENT DOCUMENTS

| 6,124,689 A * | 9/2000 | Kardash | ............. G11B 19/2009 388/811 |
| 7,948,122 B2 * | 5/2011 | Compter | ............. G03F 7/70758 414/935 |

(Continued)

FOREIGN PATENT DOCUMENTS

| CN | 103116769 A | 5/2013 |
| CN | 103354797 A | 10/2013 |

(Continued)

OTHER PUBLICATIONS

Philips Innovation Services, "Magnetic Levitation Using Inverted Planar Motor Technology," <https://www.youtube.com/watch?v=CEK7bfBLTCk>, Jan. 13, 2015.
(Continued)

*Primary Examiner* — Erick D Glass
(74) *Attorney, Agent, or Firm* — Dorsey & Whitney LLP

(57) ABSTRACT

A method for operating a planar drive system is specified. The planar drive system comprises a stator, a plurality of rotors and a main controller. The stator comprises a plurality of energizable stator conductors. Energizing of stator conductors of the stator can be controlled via the main controller. Each rotor comprises a magnet device having at least one rotor magnet. A magnetic interaction can be produced between energized stator conductors of the stator and the magnet devices of the rotors in order to drive the rotors. At least one individual rotor identifier is assigned to each rotor. An identification of the rotors is carried out by providing position information of the rotors and rotor identifiers of the rotors and linking the provided position information of the rotors to the provided rotor identifiers of the rotors via the main controller.

19 Claims, 19 Drawing Sheets

(51) Int. Cl.
*H02P 1/00* (2006.01)
*H02P 3/00* (2006.01)
*H02P 5/00* (2016.01)
*H02P 25/064* (2016.01)

(58) Field of Classification Search
USPC .......................................................... 318/135
See application file for complete search history.

(56) References Cited

U.S. PATENT DOCUMENTS

| | | |
|---|---|---|
| 10,116,195 B2 | 10/2018 | Lu |
| 10,516,359 B2 | 12/2019 | Hamm et al. |
| 2013/0313072 A1 | 11/2013 | Van De Loecht et al. |
| 2018/0229947 A1 | 8/2018 | Feyrer |

FOREIGN PATENT DOCUMENTS

| | | |
|---|---|---|
| CN | 107769512 A | 3/2018 |
| CN | 107852081 A | 3/2018 |
| CN | 109510406 A | 3/2019 |
| DE | 102009008529 A1 | 9/2010 |
| DE | 102011003682 A1 | 8/2012 |
| EP | 1842101 B1 | 9/2014 |
| EP | 3285046 A1 | 2/2018 |
| JP | 5422126 B2 | 11/2013 |
| WO | 2015179962 A1 | 12/2015 |
| WO | 2017025136 A1 | 2/2017 |

OTHER PUBLICATIONS

International Preliminary Report on Patentability dated Apr. 26, 2022 in connection with International Patent Application No. PCT/EP2021/066059, 34 pages including English translation.

International Search Report and Written Opinion dated Sep. 6, 2021 in connection with International Patent Application No. PCT/EP2021/066059, 19 pages including English translation.

Extended European Search Report dated Nov. 20, 2020 in connection with European Patent Application No. 20180860.7, 17 pages including English translation.

Office Action dated Oct. 20, 2023 in connection with Chinese patent application No. 2021800433167, 16 pages including English translation.

* cited by examiner

METHOD FOR OPERATING A PLANAR DRIVE SYSTEM AND PLANAR DRIVE SYSTEM

CROSS-REFERENCE TO RELATED APPLICATIONS

This patent application is a continuation of International Patent Application No. PCT/EP2021/066059, METHOD FOR OPERATING A PLANAR DRIVE SYSTEM, AND PLANAR DRIVE SYSTEM, filed 15 Jun. 2021, which claims the priority of European Patent Application No. EP 20 180 860.7, VERFAHREN ZUM BETREIBEN EINES PLANARANTRIEBSSYSTEMS UND PLANARANTRIEBSSYSTEM, filed 18 Jun. 2020, each of which is incorporated by reference herein, in the entirety and for all purposes.

FIELD

The present invention relates to a method for operating a planar drive system. The invention further relates to a planar drive system.

BACKGROUND

Planar drive systems may be used in various fields. Possible examples are automation technology, in particular manufacturing technology, handling technology and process engineering. A planar drive system may be used to move or position a movable element, which may e.g. be a component of a system or a machine, in at least two linearly independent directions. A planar drive system may comprise a permanently energized electromagnetic planar motor with at least one planar stator and at least one rotor movable above the stator in at least two directions.

The stator of a planar drive system may have a plurality of energizable stator conductors. The rotor may comprise a magnet device having a plurality of permanent magnets. The rotor may be driven by energizing stator conductors of the stator in the area of the rotor. This may result in a magnetic interaction between energized stator conductors and the magnet device of the rotor, wherein the rotor may be held suspended above the stator and moved above it.

In order to energize stator conductors of the stator in the area of the rotor, it is necessary to detect a position of the rotor. This may be done with the help of a position detecting system. Provided that a plurality of rotors is used on the stator, the positions of a plurality of rotors may be determined. Apart from the position detection, it may be of interest to distinguish the individual rotors from each other.

SUMMARY

The present invention provides an improved method for operating a planar drive system and an improved planar drive system.

According to a first aspect, a method for operating a planar drive system is proposed. The planar drive system comprises a stator, a plurality of rotors and a main controller. The stator comprises a plurality of energizable stator conductors. An energizing of stator conductors of the stator may be controlled via the main controller. Each rotor comprises a magnet device having at least one rotor magnet. A magnetic interaction may be produced between energized stator conductors of the stator and the magnet devices of the rotors in order to drive the rotors. At least one individual rotor identifier is assigned to each rotor. An identification of the rotors is carried out by providing position information of the rotors and rotor identifiers of the rotors and linking the provided position information of the rotors to the provided rotor identifiers of the rotors via the main controller.

According to a second aspect, a planar drive system is proposed. The planar drive system comprises a stator, a plurality of rotors and a main controller. The stator comprises a plurality of energizable stator conductors. The main controller is embodied to control an energizing of stator conductors of the stator. Each rotor comprises a magnet device having at least one rotor magnet. A magnetic interaction may be produced between energized stator conductors of the stator and the magnet devices of the rotors in order to drive the rotors. At least one individual rotor identifier is assigned to each rotor. The planar drive system is embodied to carry out an identification of the rotors by providing position information of the rotors and rotor identifiers of the rotors and linking the provided position information of the rotors to the provided rotor identifiers of the rotors via the main controller.

According to a third aspect, a planar drive system is proposed. The planar drive system comprises a stator and a plurality of rotors. The stator comprises a plurality of energizable stator conductors. Each rotor comprises a magnet device having at least one rotor magnet. A magnetic interaction may be produced between energized stator conductors of the stator and the magnet devices of the rotors in order to drive the rotors. The stator is embodied to carry out the energizing of stator conductors in such a way that an alternating magnetic field may be generated via energized stator conductors. Each rotor comprises at least one rotor coil in which an alternating voltage may be induced due to the alternating magnetic field. At least one individual rotor identifier is assigned to each rotor. Each rotor is embodied to transmit the rotor identifier to provide the rotor identifier. The planar drive system is embodied to carry out an identification of the rotors by providing position information of the rotors and rotor identifiers of the rotors and linking the provided position information of the rotors to the provided rotor identifiers of the rotors. The planar drive system is further embodied, for the identification using the provided position information of the rotors, to consecutively generate an alternating magnetic field activating the rotors for transmitting the rotor identifier by energizing stator conductors of the stator at those positions at which the rotors are located, and thereby to induce an alternating voltage in the at least one rotor coil of the rotors, so that the rotors transmit the rotor identifier in a consecutive manner.

EXAMPLES

The examples described herein relate to an improved method for operating a planar drive system in which a plurality of rotors may be distinguished from one another. Further described is a correspondingly configured planar drive system.

A method for operating a planar drive system is proposed. The planar drive system comprises a stator, a plurality of rotors and a main controller. The stator comprises a plurality of energizable stator conductors. An energizing of stator conductors of the stator may be controlled via the main controller. Each rotor comprises a magnet device having at least one rotor magnet. A magnetic interaction may be produced between energized stator conductors of the stator and the magnet devices of the rotors in order to drive the rotors. At least one individual rotor identifier is assigned to each rotor. In the method, an identification of the rotors is carried out. For this purpose, position information of the rotors and rotor identifiers of the rotors are provided, and the provided position information of the rotors is linked to the provided rotor identifiers of the rotors via the main controller.

With the proposed method, a plurality of rotors of the planar drive system may be reliably identified and thereby distinguished from one another. This is done in the method by providing position information of the rotors, i.e. information about the respective lateral position of the rotors on the stator, and rotor identifiers of the rotors. For each rotor, at least one rotor identifier associated with the respective rotor may be provided. As will be explained in more detail below, the provision of the position information and rotor identifiers may be realized by different embodiments of the planar drive system and via suitable devices and instruments. Via the main controller used for controlling the planar drive system, the position information provided for the individual rotors and the rotor identifiers provided and associated with the corresponding rotors are furthermore linked to each other and thereby assigned to each other. This makes it possible to uniquely assign and thus identify the rotors.

Further possible details and embodiments, which may be considered for the method and for the planar drive system, are described in more detail below.

The embodiments described herein may be used individually or in any combination with one another.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
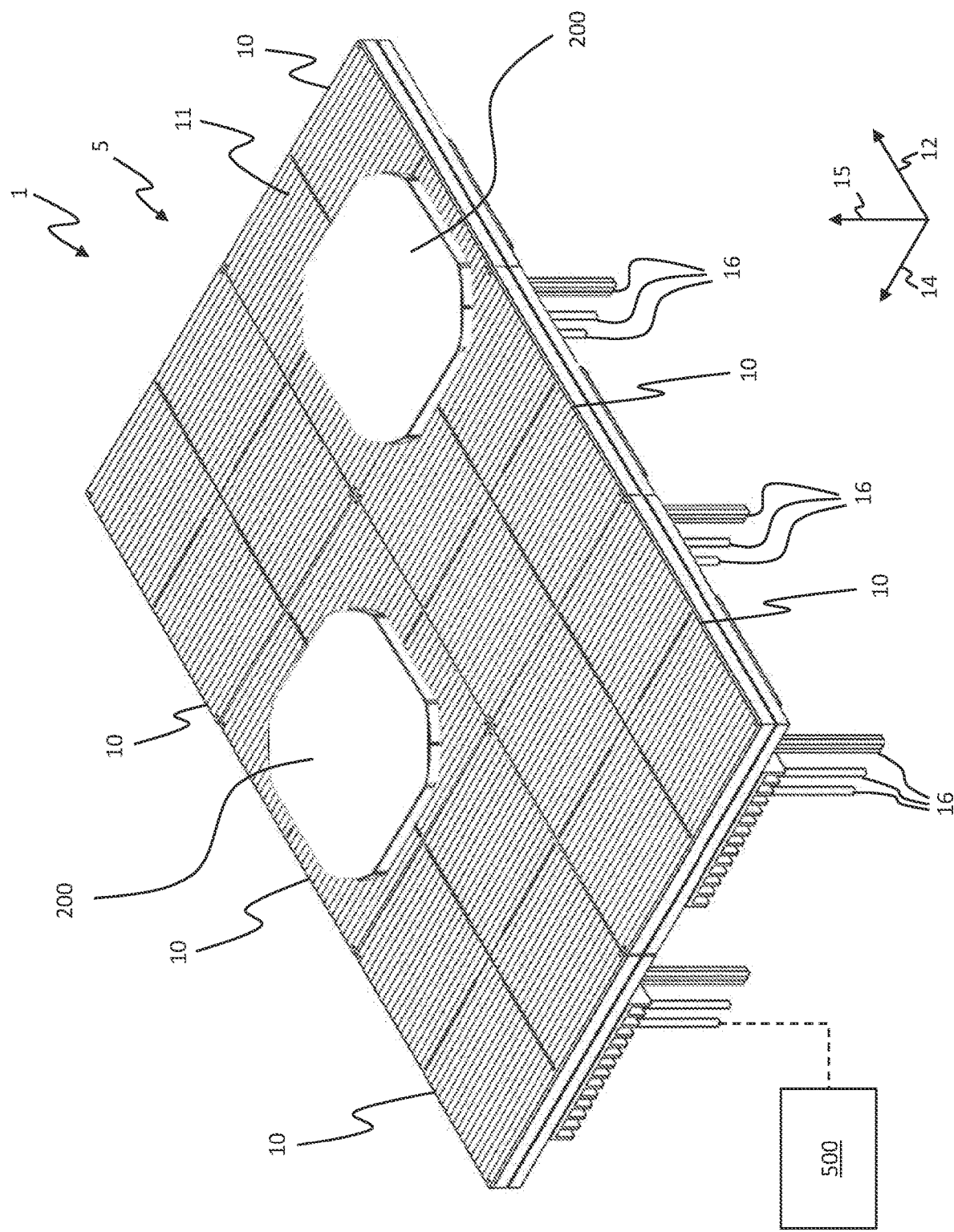
FIG. 1 shows a perspective view of a planar drive system with a stator and a plurality of rotors.

On the basis of the following schematic figures, embodiments of a planar drive system and a method for operating a planar drive system are described. The planar drive system comprises a planar stator and a plurality of movable rotors. The rotors are assigned their own rotor identifiers, which are used to identify the rotors. Based on this, operation of the planar drive system may be performed with a high degree of reliability and accuracy. With reference to the embodiments described below, it is noted that aspects and details described with respect to one embodiment may also be applied to another embodiment. Furthermore, it is possible to combine features of a plurality of embodiments.

The main controller and the stator of the planar drive system may be configured or connected to each other in such a way that data communication between the main controller and the stator is possible. Thereby, data may be transmitted from the main controller to the stator as well as from the stator to the main controller. As indicated above, the main controller is used, among other things, to control energizing of stator conductors of the stator, and thus to control driving of the rotors of the planar drive system. Here, one rotor, or a plurality of or all of the rotors may be driven simultaneously. For this purpose, the main controller may transmit corresponding control data to the stator, on the basis of which the stator energizes conductors. The control data may be target current values or comprise target current values.

The main controller of the planar drive system may be involved in providing the position information and/or in providing the rotor identifiers of the rotors. In this case, the main controller may be provided with corresponding data relating to rotor positions or rotor identifiers, which may be processed or further processed by the main controller.

In a further embodiment, providing position information of the rotors is performed using a position detecting system of the planar drive system. The position detecting system comprises a plurality of magnetic field sensors. These may be Hall sensors, for example. The magnetic field sensors may be arranged on the stator and may be components of the stator. The magnetic field sensors may be used to detect the magnetic fields generated by the magnet devices of the rotors. Based on this, the positions of the rotors may be inferred. The magnetic field sensors may generate sensor signals that may reflect the positions of the rotors. In addition to the magnetic field sensors, the position detecting system may comprise at least one processing device. The at least one processing device may also be part of the stator. Via the at least one processing device, sensor signals from magnetic field sensors may be processed and corresponding sensor data may be provided, which may be transmitted to the main controller. The main controller may be embodied for further processing of the sensor data. In this way, position information of the rotors may be provided.

In a further embodiment, the identification of the rotors is performed at a (or at each) system start or system restart of the planar drive system. In this way, the rotors may be assigned or recognized at the beginning of the respective operation of the planar drive system. In this way, e.g. an improper or faulty operation of the planar drive system may be avoided in the event that one or a plurality of rotors are moved or swapped in the switched-off state of the planar drive system.

After the identification has been carried out, the further operation of the planar drive system may be carried out via the main controller by driving individual, a plurality of or all rotors accordingly by controlling the stator. The identification and thus distinguishability of the individual rotors offers the possibility of carrying out the operation of the planar drive system with a high reliability and accuracy.

In a further embodiment, each rotor is embodied to transmit the rotor identifier to provide the rotor identifier. Furthermore, the rotors are activated for the identification such that the rotors consecutively transmit the rotor identifier.

In the above embodiment, transmission of the rotor identifiers is carried out by the rotors to provide the rotor identifiers. The activation of the rotors for transmitting the rotor identifiers may be controlled or initiated by the main controller. The rotors may serve as transmitters, which may transmit the respective rotor identifiers to at least one receiver. The received rotor identifiers or data relating to the rotor identifiers may then be forwarded to the main controller. The rotors, configured as transmitters, and the receiver may have suitable and coordinated communication devices. As will be explained in more detail below, the stator may serve as the receiver.

According to the embodiment described above, the rotors are activated in such a way that the transmission of the rotor identifiers is carried out in a consecutive manner by the rotors. In this way, the position information and the rotor identifiers of the rotors may be unambiguously and reliably linked to each other by the main controller. To achieve sequential transmission of the rotor identifiers, the rotors may be activated sequentially to transmit the rotor identifier. Activating the rotors to sequentially transmit the rotor identifiers may be accomplished in a variety of ways, as discussed in more detail below.

In a further embodiment, the stator is embodied to carry out the energization of stator conductors in such a way that an alternating magnetic field may be generated via energized stator conductors. Furthermore, each rotor comprises at least one rotor coil in which an alternating voltage may be induced due to the alternating magnetic field. This embodiment may be applied to allow for wireless or inductive power transmission from the stator to the rotors. In this regard, each rotor may further comprise a rectifier for converting the induced alternating voltage to a direct voltage. The voltage induction may further be used to activate the rotors to sequentially transmit rotor identifiers, as discussed in further detail below.

According to a further embodiment, generating an alternating magnetic field via the stator is realized in that the stator conductors are energized by current control based on pulse-width modulation (PWM). In this case, stator conductors to be energized may be supplied with an electrical voltage clocked via pulse-width modulation, and consequently with periodic voltage pulses specified by a PWM clock frequency. In this way, the electric current generated in energized stator conductors may be superimposed with an alternating current component, referred to as ripple current. The current may oscillate back and forth around an average value. The occurrence of the ripple current is associated with a magnetic field that changes over time, so that an alternating electric voltage may be induced in the at least one rotor coil of a rotor.

In a further embodiment, the stator conductors of the stator are interconnected to form multiphase systems that may be energized independently of one another. Each multiphase system may have a plurality of coils formed from stator conductors. In order to drive a rotor, one part of each multiphase system may be energized simultaneously.

The multiphase systems of the stator may be supplied with a multiphase current. Each coil of an energized multiphase system may in this context be fed with a corresponding phase of the current. The current control carried out for this purpose via the stator may be based on center-aligned pulse-width modulation (PWM), in which the coils of a multiphase system are supplied with voltage pulses center-aligned with regard to one another.

The multiphase systems of the stator may be three-phase systems or three-coil systems, each comprising three coils formed from stator conductors and interconnected with a common star point in each case. During operation of the planar drive system, such coil systems may be supplied with a three-phase current.

According to a further embodiment, the stator has a plurality of current controllers, output stage devices connected to the stator conductors or multiphase systems, and current measuring devices for carrying out current control. The current measuring devices may be used to detect actual current values of stator conductors or multiphase systems. The actual current values, together with target current values generated by the main controller, may be transmitted to the current controllers. The current controllers may be used to generate control signals based on the actual current values and target current values. The control signals, which may be pulse-width modulated control signals, may be applied to the output stage devices. Based on this, pulse-width modulated or clocked voltage pulses may be applied to stator conductors or multiphase systems of the stator via the output stage devices, wherein these are periodically energized. The output stage devices may be supplied with an intermediate circuit voltage. The intermediate circuit voltage may be provided by an intermediate circuit of the stator.

In a further embodiment, the stator comprises one or a plurality of stator modules. In an embodiment with a plurality of stator modules, these may be arranged laterally adjacent to one another. Such a stator module may comprise a plurality of the above components, i.e., a plurality of stator conductors or multiphase systems, current controllers, output stage devices, and current measuring devices. Furthermore, the or each stator module may comprise an intermediate circuit. With respect to the position detecting system described above, the or each stator module may further comprise a plurality of magnetic field sensors and a processing device.

As indicated above, each rotor may be embodied to transmit the rotor identifier to provide the rotor identifier. The stator may be embodied to carry out energizing of stator conductors or multiphase systems in such a way that an alternating magnetic field may be generated via energized stator conductors. Each rotor may have at least one rotor coil in which an alternating voltage may be induced due to the alternating magnetic field. For the identification, according to a further embodiment, it is provided to consecutively generate, via the stator, at those positions at which the rotors are located, an alternating magnetic field activating the rotors for transmitting the rotor identifier and thereby to induce an alternating voltage in the at least one rotor coil of the rotors, so that the rotors consecutively transmit the rotor identifier.

In the above embodiment, the position information of the rotors is used to appropriately energize stator conductors or multiphase systems of the stator at the different positions of the rotors in a consecutive manner, thereby generating an alternating magnetic field at these positions that activates the rotors to transmit the rotor identifiers. This may be controlled, based on the position information of the rotors, via the main controller of the planar drive system by appropriately driving the stator. The rotor identifiers transmitted in this way by the rotors in a consecutive manner and thus made available to the main controller may then be uniquely linked by the main controller to the position information of the rotors.

As stated above, the rotors are driven by magnetic interaction between energized stator conductors or multiphase systems of the stator and the magnet devices of the rotors. Via an appropriate current supply, the rotors may e.g. be held suspended above the stator and additionally moved. In order to drive the rotors, some of the stator conductors or multiphase systems may be energized simultaneously, depending on the positions of the rotors.

With regard to generating the alternating magnetic field activating the rotors for transmitting the rotor identifier, energizing stator conductors or multiphase systems of the stator at the positions of the rotors for driving them may further be carried out and thereby such a magnetic interaction with the magnet devices of the rotors may be caused that the rotors are held stationary on the stator. In this sense, according to a further embodiment, it is provided that the rotors are attracted to the stator when the activating alternating magnetic field is activated or generated. In this way, the rotors may be reliably fixed on the stator.

A plurality of multiphase systems may be energized simultaneously to drive a rotor. This applies in a corresponding manner with respect to the generation of the activating alternating magnetic field. In this case, a plurality of multiphase systems may be energized simultaneously at the positions of the individual rotors in order to generate the alternating magnetic field activating the rotors for transmitting the rotor identifier in each case. In an embodiment of the stator with a plurality of stator modules, a plurality of simultaneously energized multiphase systems may also be components of a plurality of adjacent stator modules.

In a further embodiment, each rotor has a memory device in which the (at least one) rotor identifier is stored. The memory device may be implemented in the form of a non-volatile memory device.

In a further embodiment, each rotor comprises a controller for controlling the transmission of the rotor identifier. The controller may be implemented in the form of a microcontroller. The controller may further be connected to a suitable communication device of the respective rotor and embodied to control the same to perform the transmission of the rotor identifier. Furthermore, the controller may be connected to or comprise a memory device of the rotor containing the respective rotor identifier.

With reference to the above-described sequential activation of the rotors for transmitting the rotor identifier by generating an activating alternating magnetic field via the stator, different embodiments may be considered, as will be described below.

In a further embodiment, in which each rotor has a controller for controlling the transmission of the rotor identifier, and in which the controller of each rotor may be supplied with energy via the alternating voltage induced in the at least one rotor coil, for each rotor, the energy supply to the controller is initiated by generating the activating alternating magnetic field at the position of the relevant rotor and the alternating voltage thereby induced in the at least one rotor coil, whereupon the controller initiates the transmission of the rotor identifier.

The above embodiment is based on an embodiment of the rotors in which the alternating voltage induced in the at least one rotor coil may be used to supply electrical energy to the controller of the respective rotor. For this purpose, as has been indicated above, each rotor may comprise a rectifier for converting the induced alternating voltage into a direct voltage. The direct voltage may be used to electrically power the controller of each rotor. The controller of each rotor may further be embodied to initiate the transmission of the rotor identifier as soon as the power supply due to the voltage induction in the at least one rotor coil of the respective rotor starts.

In a further embodiment, in which each rotor has a controller for controlling the transmission of the rotor identifier, for each rotor, an activation command is transmitted to the rotor by generating the activating alternating magnetic field at the position of the relevant rotor and the alternating voltage thereby induced in the at least one rotor coil, whereupon the controller initiates the transmission of the rotor identifier.

The above embodiment is based on an embodiment of the planar drive system in which data transmission from the stator to the rotors is possible. This may be achieved by energizing stator conductors or multiphase systems of the stator in such a way that the alternating magnetic field generated in this way and the alternating voltage induced in the at least one rotor coil of a rotor are modulated in a suitable manner containing the data to be transmitted. This may be achieved by temporarily influencing the energization of stator conductors to thereby temporarily cause a change with respect to the alternating voltage induced in the at least one rotor coil of a rotor. Transmission of data signals from the stator to a rotor may be accomplished by intermittently or pulse-wise influencing the energization of stator conductors, thereby also causing an intermittently or pulse-wise change with respect to the alternating magnetic field generated by the stator, and thereby with respect to the alternating voltage induced in the at least one rotor coil of a rotor.

In this context, the stator may comprise at least one influencing device, via which the energization of stator conductors or the current control of one or a plurality of multiphase systems may be temporarily influenced. In an embodiment of the stator comprising a plurality of stator modules, each stator module may comprise such an influencing device for influencing the current flow of stator conductors or multiphase systems of the respective stator module. The influencing device(s) may be controlled by the main controller. For this purpose, the main controller may transmit corresponding data control signals to the influencing device(s), on the basis of which the influencing device(s) may temporarily influence the current flow of stator conductors.

In order to detect the change in voltage induction, each rotor may have a voltage measuring device for measuring the alternating voltage induced in the at least one rotor coil. Furthermore, the controller of each rotor may be embodied to evaluate the measured induction voltage. The evaluation may determine the data signals generated by the stator.

With regard to causing the rotors to transmit the rotor identifier, the energization or influenced energization of stator conductors of the stator may take place in such a way that the activating alternating magnetic field generated thereby in each case at the position of a rotor and the alternating voltage induced thereby in the at least one rotor coil of the rotor concerned are modulated in a manner reproducing the activation command. This may be controlled by the main controller of the planar drive system. For this purpose, the main controller may control one or a plurality of influencing devices of the stator and transmit data control signals relating to the activation command to the influencing device(s). By measuring the induced alternating voltage, which may be performed using the voltage measuring device of each rotor, and by evaluating the measured induced alternating voltage, which may be performed using the controller of each rotor, the activation command may be detected by the controller of each rotor, whereupon the controller may initiate transmission of the rotor identifier.

With reference to the transmission of the rotor identifier by the rotors, the stator may serve as a receiver, as has been indicated above. In this context, embodiments described below may be applied.

As indicated above, the stator may be embodied to carry out the energization of stator conductors or multiphase systems in such a way that an alternating magnetic field may be generated via energized stator conductors or multiphase systems. Furthermore, each rotor may comprise at least one rotor coil in which an alternating voltage may be induced due to the alternating magnetic field. In a further embodiment, each rotor is embodied to transmit the rotor identifier to the stator to provide the rotor identifier. In this context, each rotor is embodied to perform the transmission of the rotor identifier to the stator by temporarily loading the at least one rotor coil in order to thereby temporarily cause an increased current consumption of energized stator conductors of the stator.

The aforementioned embodiment is based on an embodiment of the planar drive system in which data transmission from the rotors to the stator is possible via load modulation. This takes advantage of the fact that by electrically loading the at least one rotor coil of a rotor, which may be controlled via an associated controller of the rotor, energy may be extracted or extracted in amplified form from the alternating magnetic field generated via the stator. The energy extraction is associated with an increased current consumption of energized stator conductors of the stator. The temporary loading of the at least one rotor coil may be done in such a way that the increased current consumption at the stator is modulated in a suitable manner containing the data to be transmitted. A transmission of data signals from a rotor to the stator may be performed by intermittently or pulse-shaped loading of the at least one rotor coil, which may also cause an intermittently or pulse-shaped increased current consumption at the stator.

For electrical loading, each rotor may be configured to short-circuit the at least one rotor coil or a coil portion of the at least one rotor coil. The short-circuiting may be accomplished via a load resistor. To implement the short-circuiting, each rotor may comprise a switching device. The switching device of each rotor may be controlled by the associated controller.

To detect the increased current consumption of energized stator conductors, the stator may have a summation current measuring device for measuring a summation current of energized stator conductors or multiphase systems. Furthermore, the stator may have an evaluating device for evaluating the measured summation current. The evaluating device may generate corresponding evaluation signals or evaluation data, which may reflect the data signals generated by a rotor, and which may be transmitted to the main controller of the planar drive system. In an embodiment of the stator having a plurality of stator modules, each stator module may comprise a summation current measuring device to measure the increased current consumption of energized stator conductors or multiphase systems of the respective stator module. Also, each stator module may have an evaluating device for evaluating the measured summation current and generating evaluation data. The main controller may be included as part of the evaluation. In this sense, the main controller may be embodied for further processing of the evaluation signals or evaluation data coming from the stator in order to determine the data signals generated by a rotor based thereon.

With regard to transmitting the rotor identifier of a rotor to the stator, the temporary loading of the at least one rotor coil may be carried out in such a way that the increased current consumption temporarily caused thereby in the stator is modulated in a manner reflecting the rotor identifier. This may be controlled by the controller of the rotor. For this purpose, the controller may periodically or in a pulse-wise manner control the switching device of the rotor in a manner adapted to the rotor identifier for short-circuiting the rotor coil or a coil part thereof. By measuring the summation current and evaluating it via one or a plurality of summation current measuring devices and one or a plurality of evaluating devices of the stator, evaluation data reproducing the rotor identifier may be generated, which may be transmitted to the main controller, and may be further processed by the main controller. In this way, the rotor identifier may be provided.

For identifying the plurality of rotors of the planar drive system, the rotors may be sequentially activated in the manner described above for transmitting the rotor identifier, and thus sequentially transmit the respective rotor identifier to the stator by temporarily loading the at least one rotor coil. In this way, the rotor identifiers of the rotors may be made available one after the other.

In a further embodiment, each rotor is embodied to transmit the rotor identifier via radio transmission in order to provide the rotor identifier.

With reference to the aforementioned embodiment, each rotor may comprise a radio transmitter, and at least one radio receiver may be used to transmit the rotor identifiers by radio from the rotors to the at least one radio receiver. The at least one radio receiver may e.g. be arranged on the stator and/or be part of the stator. The at least one radio receiver may also be a radio receiver separate from or external to the stator, or located outside of the stator, and connected to the main controller in such a way that data communication between the main controller and the at least one radio receiver is possible. The radio transmitter of a rotor may be controlled by an associated controller of the rotor. The rotor identifiers received by the radio receiver(s), or receipt data reproducing the rotor identifiers, may be further transmitted to the main controller, and further processed by the main controller.

For identifying the plurality of rotors of the planar drive system, the rotors may be sequentially activated in the manner described above for transmitting the rotor identifier, and thus sequentially transmit the respective rotor identifier by radio transmission to at least one radio receiver or to the stator. In this way, the rotor identifiers of the rotors may be made available one after the other.

Apart from the embodiments described above, further embodiments may be considered to provide rotor identifiers of the rotors as well as position information of the rotors, which are linked via the main controller.

It is e.g. possible that the rotor identifiers assigned to the rotors are visually present on the rotors or are implemented in the form of visually visible signs on the rotors. For example, the rotor identifiers may be printed on the rotors. Another example is stickers reproducing the rotor identifiers and arranged on the rotors. The optically visible rotor identifiers may also take the form of a machine-readable identifier, a QR code (quick response), a barcode or plain text.

In order to provide the main controller with such rotor identifiers, the planar drive system may e.g. comprise a camera. With the help of the camera, the optically visible rotor identifiers of the rotors may be read out and thus made available to the main controller. The main controller and the camera may be connected to each other in such a way that data communication between the main controller and the camera is possible. The camera may be embodied or arranged in such a way that all rotors may be located in the image area of the camera, so that all rotors and their rotor identifiers may be recorded via the camera.

By using the camera, position information of the rotors may further be provided to the main controller. The camera-based position information may be combined or matched by the main controller with position information that may be provided using the position detecting system described above and comprising magnetic field sensors.

For providing the rotor identifiers and the position information, it is also possible that the rotors are not located at different positions on the stator. Instead, the rotors may be moved individually or one after the other by driving the rotors to a predetermined position on the stator, at which the rotor identifier of a rotor is provided in each case. This may be controlled via the main controller by appropriately driving the stator to energize stator conductors. The predetermined position may thereby serve as a readout station of the stator. In this way, the same position information may be provided for each of the rotors during identification. For providing the rotor identifiers, e.g. a camera connected to the main controller may be used, as described above. The camera may be located in the area of the predetermined position so that the rotors may be moved individually under the camera for reading out the optically visible rotor identifier.

A readout station at a predetermined position on the stator may be realized not only using a camera, but alternatively using other equipment. For example, it may be considered to use the predetermined position as a defined radio transmission area at which the rotors may transmit the respective rotor identifier, according to the embodiment described above, to a radio receiver via radio transmission. The radio receiver may be part of the stator, or an external radio receiver. The radio receiver may be present in the area of the predetermined position, or at another location. The rotors may have radio transmitters, which may be controlled by controllers of the rotors. A radio transmission technique such as NFC (near field communication) may also be used to transmit the rotor identifiers. In this context, the stator may have an NFC reader in the area of the specified position, and the rotors may have NFC transponders. It is also possible to use an external NFC reader separate from the stator in the area of the specified position, which is connected to the main controller. The rotor identifiers obtained via the radio receiver or the NFC reading device, or data relating thereto, may be forwarded to the main controller.

It is further possible to provide a plurality of predetermined positions or spatially distributed readout stations on the stator to which the rotors may be moved by driving them in order to provide the respective rotor identifier at these locations. This may also be controlled via the main controller by appropriately driving the stator to energize stator conductors. In this way, different position information of the rotors may be provided in the identification process. The provision of the rotor identifiers at the different predetermined positions or readout stations may be carried out analogously to the embodiments described above, in that cameras for reading out the optically visible rotor identifiers, or radio receivers or NFC reading devices are present at these locations, wherein the rotor identifiers may be transmitted from the rotors to the radio receivers or NFC reading devices, and thereupon to the main controller.

With regard to transmitting the rotor identifiers from the rotors by radio, the following embodiments may also be used. A plurality of radio receivers, e.g. arranged at the edge of the stator, may be used. These may be components of the stator, as the case may be. The rotors may have a radio transmitter for transmitting or communicating the rotor identifier to the radio receivers. The radio transmitters may be controlled by controllers of the rotors. On the basis of different signal strengths of radio signals, which may be emitted by the radio transmitters when transmitting the rotor identifiers, or using radio direction finding via triangulation, the positions of the rotors may be detected and position information of the rotors may be provided. In this context, the use of directional radio may also be considered. In this case, the radio transmitters of the rotors may be embodied to emit radio signals in different directions, which also makes it possible to detect the position on the basis of different signal strengths and thus to provide position information of the rotors. The transmission of the rotor identifiers by the radio transmitters of the rotors may take place consecutively or simultaneously.

The methods described above (radio direction finding, directional radio) may be used to roughly record the positions of the rotors. In addition, further position information of the rotors may be used, which may be provided via the position detecting system described above and comprising magnetic field sensors. In this context, the rough position information may be combined or matched by the main controller with position information that may be provided using the magnetic field sensors.

In embodiments in which rotor identifiers are provided by radio transmission, activation of the rotors to transmit the rotor identifiers may be performed according to the embodiments described above. In this sense, an alternating magnetic field activating the rotors may be generated at the positions of the rotors, thereby inducing an alternating voltage in the at least one rotor coil of the rotors. By generating the alternating magnetic field and inducing the alternating voltage, the power supply to controllers of the rotors may be initiated or an activation command may be transmitted to the rotors, whereupon the controllers may initiate the transmission of the rotor identifiers.

With reference to activating the rotors to send out the rotor identifiers by radio transmission, it is further conceivable to also perform the activation of the rotors by radio by transmitting an activation command by radio to one or a plurality of rotors. For this purpose, the stator and the rotors may have respective radio transceivers to transmit an activation command by radio from the stator to the rotors, and to also transmit the rotor identifiers by radio from the rotors to the stator. It is also possible to use an external radio transceiver separate from the stator, which may be connected to the main controller. In this case, an activation command may be transmitted by radio from the external radio transceiver to the rotors, and the rotor identifiers may also be transmitted by radio from the rotors to the external radio transceiver, and from this further to the main controller.

It is furthermore possible that the rotors comprise an electrical energy storage device via which the energy for transmitting the rotor identifier may be provided. Via such an energy storage of a rotor, rotor components described above, such as a controller, a radio transmitter, etc., or at least one further device, which may be arranged on the rotor and/or be a component of the rotor, may be supplied electrically.

After performing the identification, the rotor identifiers of the rotors may be used for control purposes. This is e.g. the case in the following embodiment. Here, the energization of stator conductors for driving at least one rotor, which may be controlled via the main controller as indicated above, is carried out on the basis of a parameter set which is assigned to the rotor identifier of the respective rotor and thus to the rotor. The parameter set may be an individualized parameter set, and adapted to the driving of the rotor. In a corresponding manner, the energizing of stator conductors for driving a plurality of or all rotors of the planar drive system may be carried out on the basis of parameter sets assigned to the rotor identifiers of the respective rotors.

The aforementioned embodiment may be based on the fact that one or a plurality of rotors of the planar drive system or their magnet devices may have tolerance deviations due to manufacturing. For such rotors, an individualized parameter set may be determined in each case by measuring or calibrating, which may be performed after the rotors have been manufactured. Using an individualized parameter set, the main controller may perform a more precise control of the drive of the associated rotor, i.e. one that at least partially compensates for the tolerance deviation.

The individualized parameter sets may e.g. be downloaded from a server with the respective rotor identifiers. Furthermore, the individualized parameter sets may also be stored in the rotors, e.g. in a memory device thereof. In this context, the individualized parameter sets may be transmitted to the main controller, possibly via the stator, using methods described above (load modulation or radio). This may e.g. be done during initial operation of the planar drive system.

In this context, it is also possible to provide a multi-stage system of parameter sets of the rotors via their rotor identifiers. In a first stage, the control of the driving of the rotors performed via the main controller may be carried out using generalized parameters which are the same for all rotors. In a second stage, the control of the driving of a single, a plurality of or all rotors of the planar drive system may be carried out using individualized parameter sets which have been determined during the production of the respective rotors. In a third stage, even more precise individualized parameter sets may be used, which have e.g. been obtained by measuring over a longer period of time or with a higher resolution.

Apart from this, the rotor identifiers of the rotors may also be used for another purpose. For example, it is possible to use the rotor identifiers to track products or rotors from production to use or service.

The used rotor identifiers may be system-wide rotor identifiers, which are only related to the considered planar drive system and its rotor. With respect to at least one further planar drive system, the same system-wide rotor identifiers may be used, which are again related to the respective planar drive system.

Furthermore, the rotor identifiers used may also be global rotor identifiers. Such rotor identifiers may be assigned only once for each rotor and may therefore be unique.

It is further possible that both system-wide rotor identifier and global rotor identifier are assigned to the rotors. In this case, the system-wide rotor identifiers may be used in the usual operation of the planar drive system in order to uniquely assign and recognize the rotors by performing the identification. The global rotor identifiers, on the other hand, may e.g. be used to perform rotor tracking, or to provide individualized parameter sets for more precise control of rotors. With reference to the planar drive system under consideration, a combination of global rotor recognition and system-wide rotor recognition may be made in this context in order to provide the main controller with individualized parameter sets for rotors of the planar drive system, on the basis of which the main controller may carry out more precise control of the driving of the rotors, as indicated above.

Within the framework of identifying the rotors, a provision of system-wide rotor identifiers of the rotors may be carried out. It is also possible to provide global rotor identifiers, or to provide system-wide rotor identifiers and global rotor identifiers of the rotors.

A planar drive system is proposed. The planar drive system may be configured to carry out the method described above, or to perform one or a plurality of the embodiments of the method described above. The planar drive system comprises a stator, a plurality of rotors and a main controller. The stator comprises a plurality of energizable stator conductors. The main controller is configured to control an energizing of stator conductors of the stator. Each rotor comprises a magnet device having at least one rotor magnet. A magnetic interaction may be produced between energized stator conductors of the stator and the magnet devices of the rotors in order to drive the rotors. At least one individual rotor identifier is assigned to each rotor. The planar drive system is embodied to perform an identification of the rotors by providing position information of the rotors and rotor identifiers of the rotors and linking the provided position information of the rotors to the provided rotor identifiers of the rotors via the main controller.

For the planar drive system, the same features, details and embodiments may be applied and the same advantages may be considered as described above with reference to the method. By providing position information and rotor identifiers of the rotors and by linking the position information and the rotor identifiers via the main controller, a unique allocation and thus identification of the rotors may be achieved.

FIG. 1 shows a perspective view of an embodiment of a planar drive system 1, which comprises a stator 5 and a plurality of rotors 200. The rotors 200 are movably arranged above the stator 5 during operation of the planar drive system 1. The planar drive system 1 further comprises a main controller 500 schematically indicated in FIG. 1. The main controller 500 serves to control the stator 5, and thus to control driving of the rotors 200. The stator 5 of the planar drive system 1 comprises a plurality of stator modules 10 arranged side by side.

Figure 2:
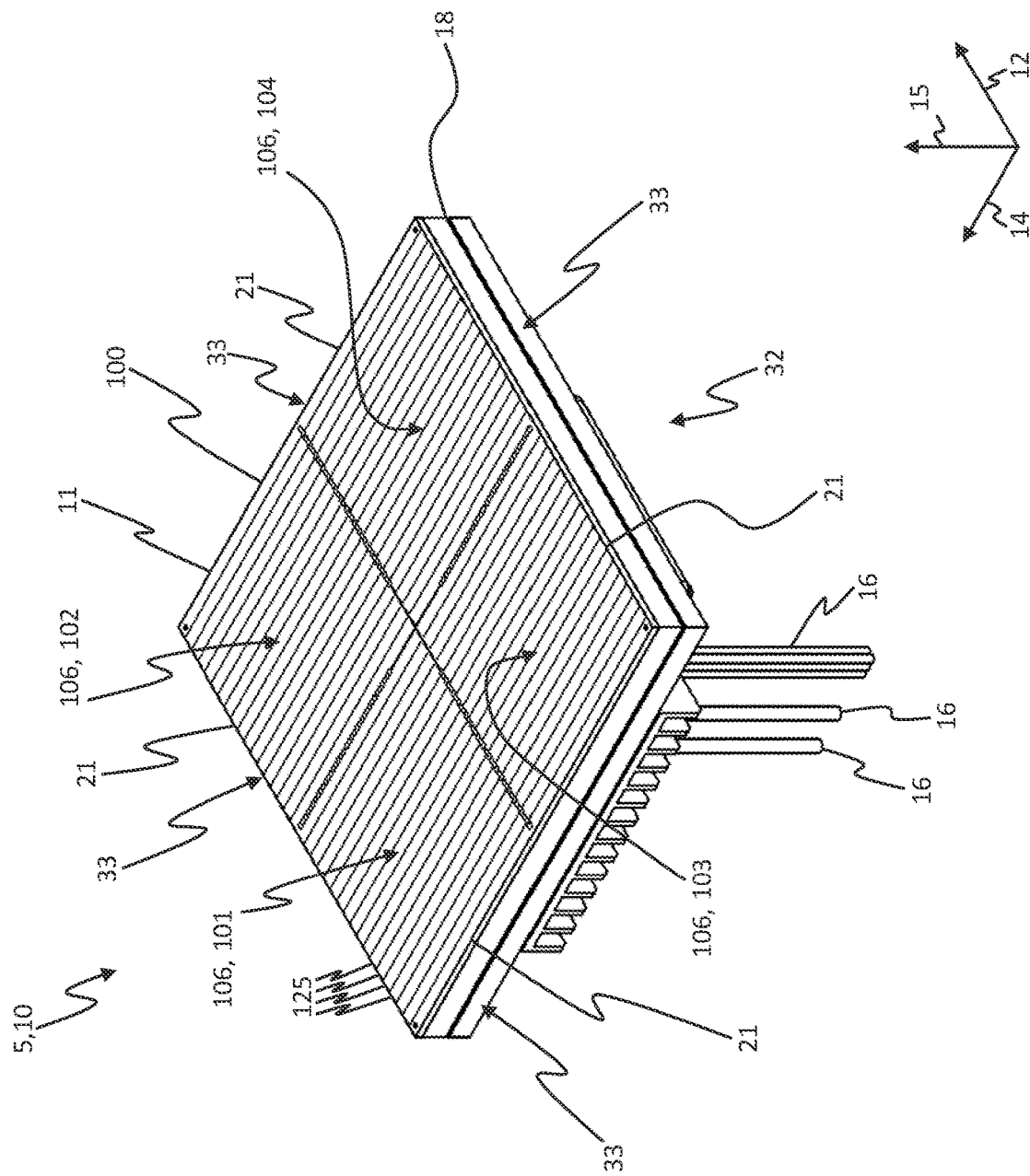
FIG. 2 shows a perspective view of a stator module of the stator.

FIG. 2 shows a perspective view of an individual stator module 10 of the stator 5 according to a possible embodiment. The stator module 10 comprises a module housing 18 and a stator assembly 100, which is arranged on an upper side of the module housing 18. The stator assembly 100 is embodied as a planar stator and comprises a flat or planar stator surface 11. The stator surface 11 extends over the entire top surface of the stator assembly 100 and of the stator module 10. The stator assembly 100 comprises a plurality of metallic stator conductors 125 that may be supplied with electrical drive currents. The stator conductors 125 may also be referred to as coil conductors or conductor strips.

Figure 3:
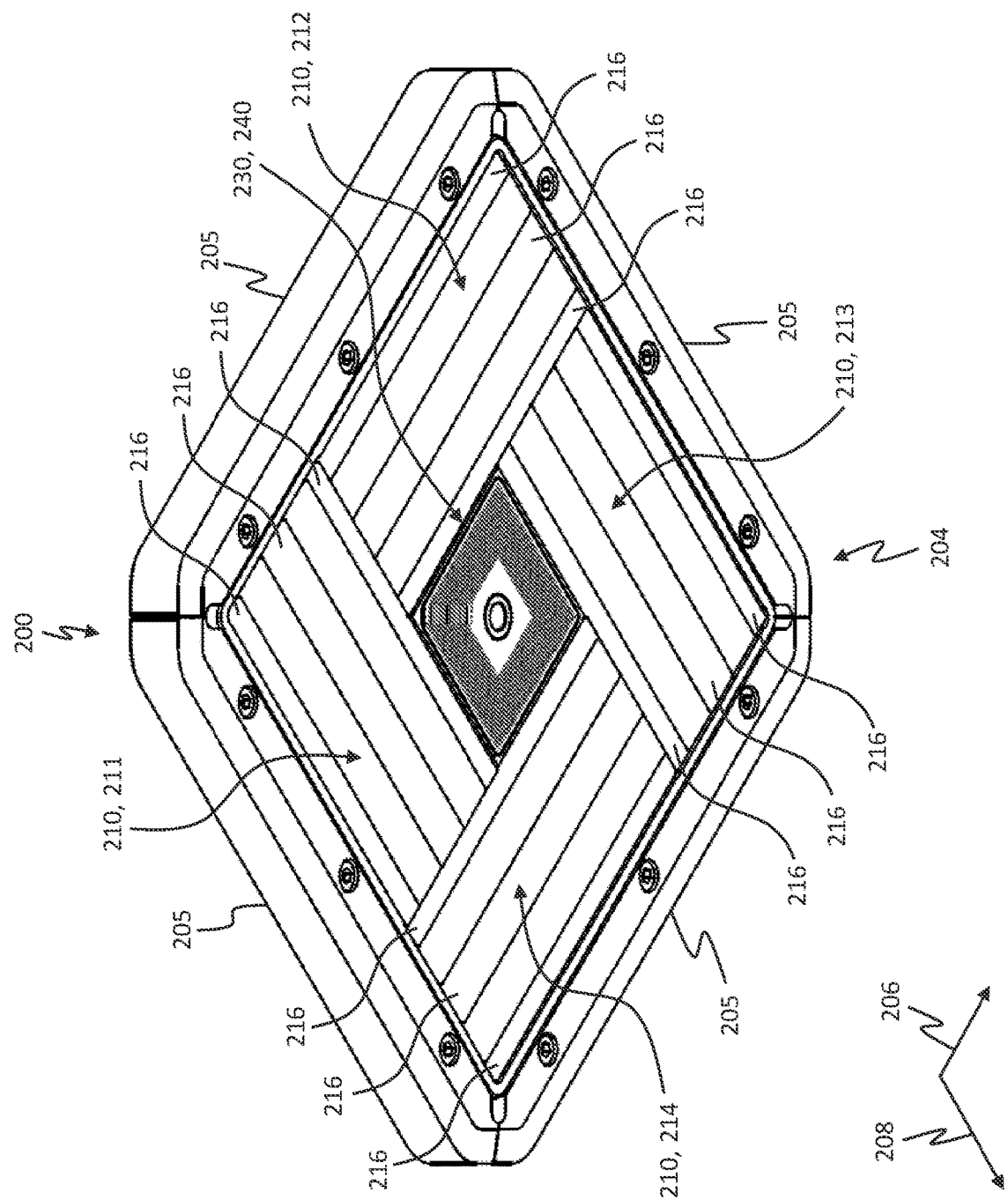
FIG. 3 is a perspective view of a rotor.

By energizing stator conductors 125 of the stator module 10, a magnetic field may be generated which may drive a rotor 200 of the planar drive system 1 in interaction with a magnet device 204 of the rotor 200 (cf. FIG. 3). Hereby, the rotor 200 may be held suspended above the stator surface 11 and may also be moved. A movement of the rotor 200 may take place in a first direction 12 as well as in a second direction 14. As shown in FIG. 2 (and also FIG. 1), the first direction 12 and second direction 14 are oriented perpendicular with regard to each other, and respectively in parallel to the stator surface 11. By moving a rotor 200 in both the first direction 12 and the second direction 14, the rotor 200 may be moved in any direction across the stator surface 11. Driving a rotor 200 is further possible in a third direction 15 oriented perpendicular to the first direction 12, the second direction 14 and the stator surface 11. In this way, the distance of the respective rotor 200 to the stator surface 11 may be varied, i.e. the rotor 200 may be raised or lowered above the stator surface 11. It is also possible to pull the rotor 200 towards the stator module 10 and thereby press it against it.

In the module housing 18 of the stator module 10 shown in FIG. 2 are other electrical and electronic components and devices of the stator module 10 are arranged. These components serve, among other things, to generate electrical drive currents and thereby to energize stator conductors 125 of the stator module 10. As will be explained in more detail below, the energization is effected by a current control based on pulse-width modulation.

At a module underside 32 of the module housing 18 opposite to the stator surface 11 connections are provided which are used to connect the stator module 10 to a plurality of connection lines 16. The connection lines 16 may comprise a power supply line for supplying electrical power to the stator module 10, an input data line, and an output data line. The power supply line may be used to supply electrical power to the stator module 10 to, inter alia, generate drive currents. Data may be sent to and from the stator module 10 via the input data line and the output data line. In this way, data communication between the stator module 10 and the main controller 500 (cf. FIG. 1) of the planar drive system 1 may be realized. This e.g. comprises the transmission of control signals or control data, such as electrical target current values or other data, from the main controller 500 to the stator module 10. In a corresponding manner, data, for example position data of the rotors 200 and data representing rotor identifiers of the rotors 200, may be transmitted from the stator module 10 to the main controller 500.

It is clear from FIG. 2 that the module housing 18, the stator assembly 100 and the stator surface 11 of the stator module 10 are rectangular or square when viewed from above the stator surface 11. The stator surface 11 is delimited by four respective straight outer edges 21. Two respective outer edges 21 are oriented in parallel to the first direction 12, and two further outer edges 21 are oriented in parallel to the second direction 14. The stator module 10 and the module housing 18 further have, between the stator surface 11 and the opposite module underside 32, four planar side surfaces 33 which are flush with the outer edges 21 at the stator surface 11.

The stator 5 of the planar drive system 1 shown in FIG. 1 is constructed from a plurality of specimens of the stator module 10 shown in FIG. 2. The plurality of stator modules 10 are arranged side by side so that the outer edges 21 and side surfaces 33 of adjacent stator modules 10 are adjacent to one another. In this way, the stator surfaces 11 of the stator modules 10 form a continuous working surface over which the rotors 200 of the planar drive system 1 may be moved without interruption. This is done by applying an appropriate current to stator conductors 125 of the stator modules 10, wherein magnetic fields driving the rotors 200 may be generated.

FIG. 1 shows an embodiment of the stator 5 with six stator modules 10 arranged side by side. The stator modules 10 are arranged side by side in two first rows arranged side by side to each other in the second direction 14 and extending along the first direction 12 and in three second rows or columns arranged side by side to one another in the first direction 12 and extending along the second direction 14. Apart from the above, other embodiments with other arrangements and/or other numbers of stator modules 10 arranged side by side may be considered for the stator 5. Correspondingly, apart from the two rotors 200 shown in FIG. 1, the planar drive system 1 may comprise a different or larger number of rotors 200.

The above-mentioned energy supply and data communication with the main controller 500 may be implemented in each of the stator modules 10 of the stator 5 via respective dedicated connection lines 16 of the stator modules 10. Alternative embodiments of the stator modules 10 may further comprise electrical connection elements via which electrical power and/or data may be transmitted from one stator module 10 to an adjacent stator module 10. Such connection elements may e.g. be arranged on the side surfaces 33 of the stator modules 10.

Before further details of the stator 5 are described, an embodiment of the rotors 200 will first be discussed in more detail. The rotors 200 may be realized as follows.

FIG. 3 shows an embodiment of a rotor 200 of the planar drive system 1 in a perspective view from below at an underside of the rotor 200. In operation of the planar drive system 1, the underside of the rotor 200 is arranged facing the stator surfaces 11 of the stator modules 10 of the stator 5. Also, the rotor 200 or its underside are oriented in parallel or essentially in parallel to the stator surfaces 11. The rotor 200 comprises a magnet device 204 on its underside. The magnet device 204 has a rectangular or square outer contour, and comprises four magnet units 210, i.e., a first magnet unit 211, a second magnet unit 212, a third magnet unit 213, and a fourth magnet unit 214. The first magnet unit 211 and the third magnet unit 213 each have elongated rotor magnets 216 arranged side by side in a first rotor direction 206 and extending along a second rotor direction 208 oriented perpendicular to the first rotor direction 206. The second magnet unit 212 and the fourth magnet unit 214 each comprise elongated rotor magnets 216 arranged side-by-side in the second rotor direction 208 and extending along the first rotor direction 206. The rotor magnets 216 are permanent magnets. The first magnet unit 211 and the third magnet unit 213 serve to drive the rotor 200 in the first rotor direction 206, and the second magnet unit 212 and the fourth magnet unit 214 serve to drive the rotor 200 in the second rotor direction 208.

The magnet units 210 of the magnet device 204 and the rotor magnets 216 thereof are arranged to surround an area. In the area surrounded by the rotor magnets 216, the rotor 200 according to the embodiment shown in FIG. 3 comprises a first printed circuit board 230 having a rotor coil 240. The first printed circuit board 230 may be multilayered, and may comprise a plurality of stacked and electrically interconnected spiral-shaped metallic conductor tracks. The rotor coil 240 may be formed by the interconnected spiral-shaped conductor tracks. The rotor coil 240, together with the stator conductors 125 of the stator 5, may be used for inductive power transfer from the stator 5 to the rotor 200 and, depending on the embodiment, for data transfer between the stator 5 and the rotor 200. As will be discussed in more detail below, this takes advantage of the fact that pulse-width modulated electrical control of stator conductors 125 generates a ripple current and thereby an alternating magnetic field so that an alternating electrical voltage may be induced in the rotor coil 240. The induced alternating voltage may be used to supply power, and for this purpose may be rectified using a rectifier 260 of the rotor 200 (see FIGS. 6 and 8).

The rotor 200 shown in FIG. 3 further comprises four spacers 205 surrounding the magnet device 204 and forming lateral outer sides of the rotor 200. With reference to the plurality of rotors 200 of the planar drive system 1 (cf. FIG. 1), the spacers 205 may ensure that a minimum distance is maintained between the magnet devices 204 of the rotors 200 when the spacers 205 of two rotors 200 are in contact. In this way, it may be avoided that the undersides of the rotors 200 are straightened from the position parallel to the stator surfaces 11 by an attractive force between their magnet devices 204 and that the rotors 200 remain magnetically stuck to one another with their undersides facing each other.

As described above, each stator module 10 of the stator 5 comprises a stator assembly 100 having a plurality of energizable stator conductors 125. As shown in FIG. 2, the stator assembly 100 comprises four stator sectors 106, i.e., a first stator sector 101, a second stator sector 102, a third stator sector 103, and a fourth stator sector 104. The stator sectors 106 each comprise a portion of the respective stator conductors 125 that are electrically insulated from each other. The stator sectors 106 are rectangular or square in shape, and each comprise a quarter of the area, i.e., a quadrant, of the stator assembly 100.

Within the stator sectors 106, the stator conductors 125 are arranged in a plurality of stator layers arranged on top of one another. Each stator layer comprises only stator conductors 125, which are either arranged side by side along the first direction 12 and extend in an elongated manner along the second direction 14, or only stator conductors 125, which are arranged side by side along the second direction 14 and extend in an elongated manner along the first direction 12. In FIG. 2 (and also FIG. 1), only the uppermost stator layers of the stator sectors 106 are shown, which comprise stator conductors 125 extending along the second direction 14. Below these are further stator layers comprising stator conductors 125 extending along the second direction 14 or along the first direction 12.

A plurality of stator conductors 125 of the individual stator sectors 106 running along the first direction 12 or along the second direction 14 are each connected to form three-phase coil systems that may be energized independently of one another, which are also referred to below as three-phase systems 150. A three-phase system 150 is realized in the form of a star connection of three coils 160 (cf. FIG. 4). The three-phase systems 150 may be supplied with a three-phase electrical drive current during operation of the planar drive system 1. Here, a first phase U, a second phase V and a third phase W of the drive currents may each have a phase offset of 120° with regard to one another.

In a possible embodiment, the stator conductors 125 of the stator assembly 100 of a stator module 10 are interconnected to form a total of twenty-four three-phase systems 150. The three-phase systems 150 thereby comprise twelve first three-phase systems and twelve second three-phase systems, wherein the twelve first three-phase systems are realized from stator conductors 125 extending in the second direction 14, and the twelve second three-phase systems are realized from stator conductors 125 extending in the first direction 12. Here, each stator sector 106 comprises three first three-phase systems and three second three-phase systems. The magnetic field generated by the first three-phase systems may provide for movement of a rotor 200 along the first direction 12. The magnetic field generated by the second three-phase systems may provide for movement of a rotor 200 along the second direction 14.

In operation of the planar drive system 1, the rotors 200 may be arranged above the stator in such a way that the first rotor direction 206 shown in FIG. 3 is oriented along the first direction 12 and the second rotor direction 208 is oriented along the second direction 14. Here, the first magnet unit 211 and third magnet unit 213 of the magnet device 204 of a rotor 200 may interact with the magnetic field generated by the first three-phase systems to cause the respective rotor 200 to move along the first direction 12. The second magnet unit 212 and fourth magnet unit 214 may interact with the magnetic field generated by the second three-phase systems to cause movement of the rotor 200 along the second direction 14. Alternatively, the rotors 200 may be oriented such that the first rotor direction 206 is oriented along the second direction 14 and the second rotor direction 208 is oriented along the first direction 12. Here, the first magnet unit 211 and third magnet unit 213 of a rotor 200 may interact with the magnetic field of the second three-phase systems for driving the rotor 200 in the second direction 14, and the second magnet unit 212 and fourth magnet unit 214 may interact with the magnetic field of the first three-phase systems for driving the rotor 200 in the first direction 12.

A rotor 200 of the planar drive system 1 is driven by suitable energization of three-phase systems 150 of at least a stator module 10 of the stator 5. In this case, some of the three-phase systems 150 may be electrically controlled simultaneously by one or a plurality of adjacent stator modules 10 of the stator 5. This applies to three-phase systems 150 which are located in the area of the rotor 200 to be driven. In this context, the current position of the rotor 200 is taken into account. For this purpose, a position detecting system is used, which comprises a plurality of magnetic field sensors 115 (cf. FIGS. 6 and 7). By using the position detecting system, position information of the rotor 200 may be provided, as will be explained in more detail below.

Figure 4:
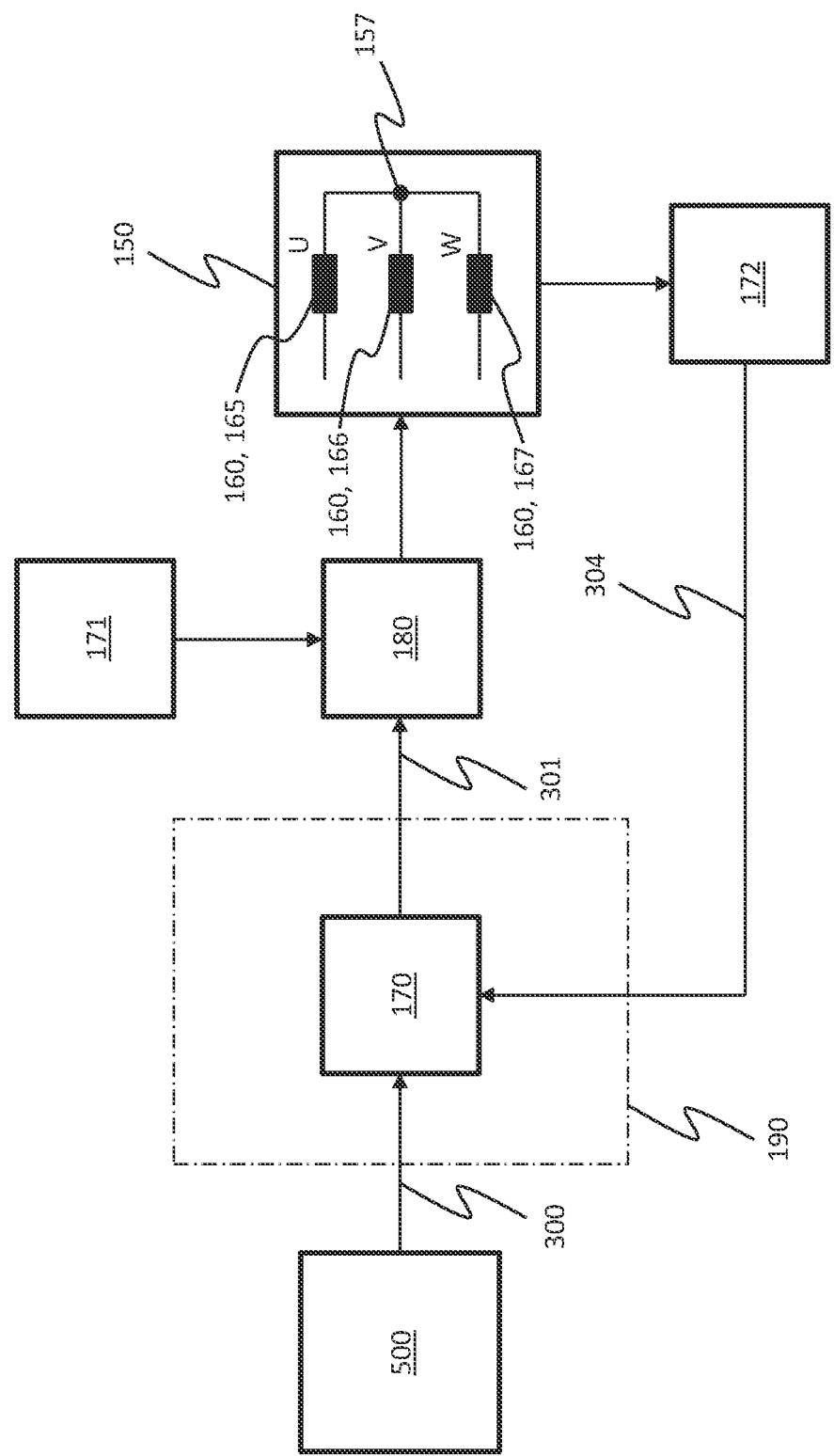
FIG. 4 shows a control loop for current control of a coil system of the stator based on pulse-width modulation.

Energizing of three-phase systems 150 of stator modules 10 of stator 5 is carried out by current control based on pulse-width modulation, as indicated above. For illustration purposes, FIG. 4 shows a block diagram of a control loop for current control of a three-phase system 150 of a stator module 10, as may be applied to the planar drive system 1. The control loop comprises, in addition to the main controller 500 of the planar drive system 1, a module controller 190, an output stage device 180, an intermediate circuit 171, a three-phase system 150 and a current measuring device 172. The module controller 190, which comprises a current controller 170, may be implemented in the form of an FPGA (field programmable gate array). The output stage device 180, which may be in the form of a driver circuit having three half-bridges, is connected to the intermediate circuit 171 so that the output stage device 180 may be supplied with an intermediate circuit voltage. The intermediate circuit 171, which may comprise an intermediate circuit memory, may also be referred to as a direct voltage intermediate circuit. The three-phase system 150 comprises three coils 160, i.e., a first coil 165, a second coil 166, and a third coil 167, which are interconnected in a common star point 157. In operation, the first coil 165 may be used to energize the first phase U of a three-phase drive current, and the second coil 166 may be used to energize the second phase V and the third coil 167 may be used to energize the third phase W of the drive current. The module controller 190, the output stage device 180, the intermediate circuit 171, the three-phase system 150, and the current measuring device 172 are components of a stator module 10 of the stator 5 of the planar drive system 1.

The electrical current measuring device 172 is embodied to detect actual current values 304 of the three-phase system 150. This may be done by periodically sampling at predetermined points in time. During current measurement, only the currents of two of the three coils 160 of the three-phase system 150 may be sampled. This is because the currents flowing in the two sampled coils 160 may be used to infer the current flowing in the non-sampled coil 160. This is due to the star connection of the coils 160 of the three-phase system 150.

As shown in FIG. 4, during operation of the planar drive system 1, target current values 300 are generated by the main controller 500 and transmitted to the current controller 170. Furthermore, actual current values 304 obtained from the current measuring device 172 by sampling at the three-phase system 150 are transmitted to the current controller 170. Based on the target current values 300 and actual current values 304, pulse-width modulated control signals 301 are generated by the current controller 170, which are applied to the output stage device 180. Based on the control signals 301, pulse-width modulated voltage pulses equal to the intermediate circuit voltage may be applied to the three-phase system 150 or its coils 160 via the output stage device 180, allowing corresponding drive currents to flow therein.

Each stator module 10 is embodied to perform its own current control for each of the associated three-phase systems 150, and in this respect independent of other three-phase systems 150, in accordance with the control loop shown in FIG. 4. Therefore, each stator module 10 comprises, for each three-phase system 150, a current controller 170 and an output stage device 180. With reference to the above embodiment of each stator module 10 having twenty-four three-phase systems 150, twenty-four current controllers 170 per stator module 10 may be provided, which are integrated in the associated module controller 190 of the respective stator module 10, and twenty-four output stage devices 180. The output stage devices 180 are each supplied with electrical power from the intermediate circuit 171 of the respective stator module 10.

With respect to current measurement, it is also possible to provide a current measuring device 172 for each three-phase system 150. Alternatively, each stator module 10 of the stator 5 may comprise a plurality of current measuring devices 172, each of which is connected to a group of three three-phase systems 150, and thereby each associated with such a group of three three-phase systems 150 for current sampling. Each stator module 10 may thereby comprise eight current measuring devices 172.

As indicated above, the main controller 500 of the planar drive system 1 is suitably connected to the stator modules 10 of the stator 5 to allow for data communication between the main controller 500 and the stator modules 10. In order to drive a rotor 200, the main controller 500 may communicate target current values 300 to one or a plurality of current controllers 170 of one or a plurality of stator modules 10, allowing pulse-width modulated current to be applied to the associated three-phase systems 150. The main controller 500 takes into account the current position of the rotor 200 to be driven, which may be provided via the position detecting system.

Figure 5:
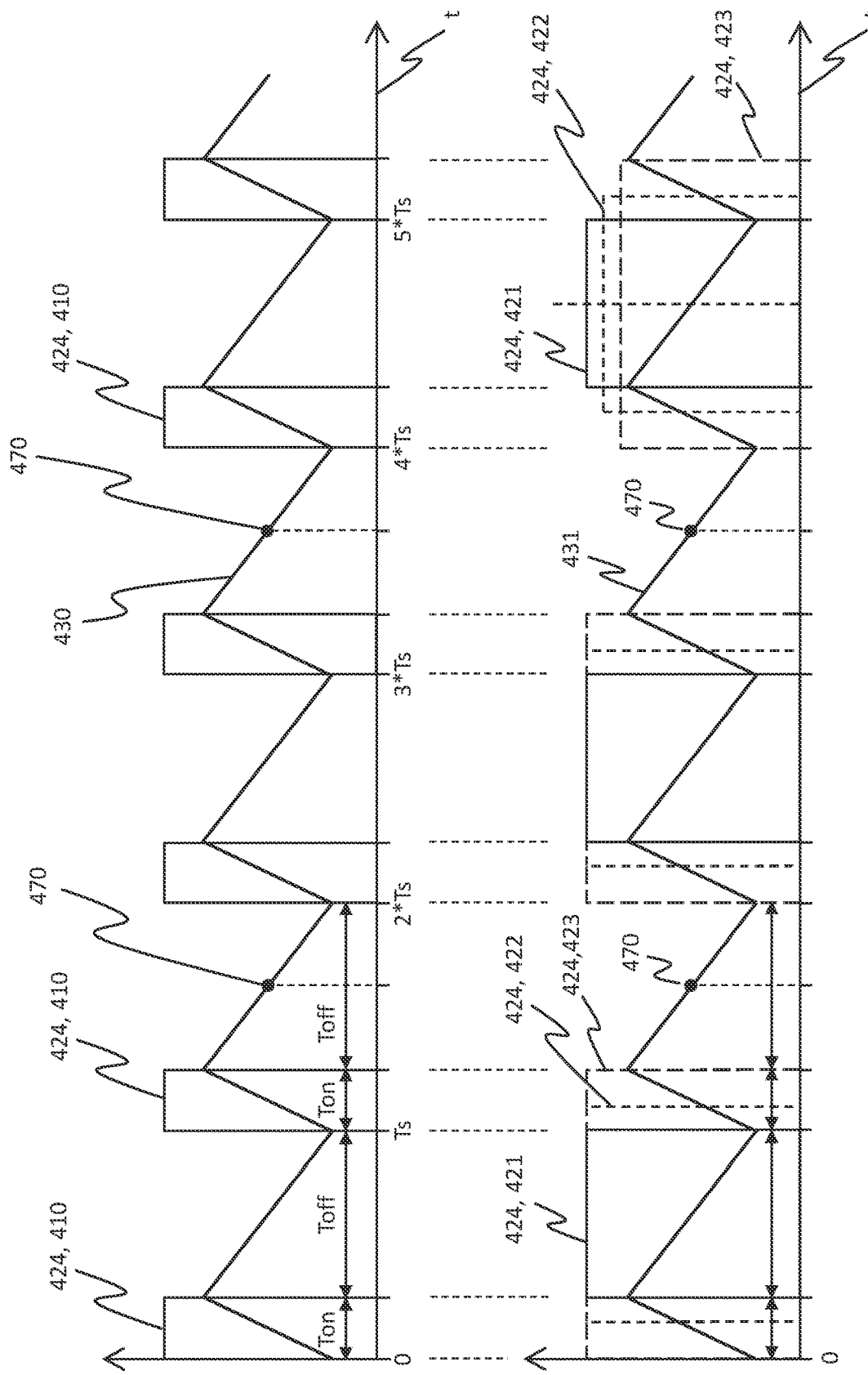
FIG. 5 shows voltage and current curves over time for pulse-width modulated energization of a single-phase and a three-phase coil system.

FIG. 5 shows possible electrical voltage and current curve as a function of time t, as they may occur with pulse-width modulated electrical control of coil systems. The upper diagram of FIG. 5 shows, for simplified illustration, conditions with a control of a single-phase coil system with only one coil 160. The coil system is supplied with an electrical control voltage given by the PWM clock frequency, and thus with periodic voltage pulses 424. With reference to the single-phase coil system, these will be referred to hereinafter as first voltage pulses 410. The voltage exhibits a nearly rectangular curve with two voltage levels. In addition, a period duration Ts of the pulse-width modulation, as well as a pulse duration Ton and a time-out duration Toff are shown. During the pulse duration Ton, in which voltage is applied to the coil system, a first voltage pulse 410 is present in each case. During the time-out period Toff, no voltage is applied to the coil system. Due to a smoothing effect of the coil system, the electric current flowing in the coil system follows the first voltage pulses 410 in such a way that a triangular first current curve 430 occurs. Provided that the first voltage pulses 410 are applied to the coil system, there is an increase in the current or current magnitude, and otherwise a decrease. In this way, the current oscillates back and forth about an average value with the clock frequency of the pulse-width modulation and thus the period Ts. The average value of the current depends on the duty cycle, i.e. the ratio of the pulse duration Ton to the period duration Ts. The current flowing in the coil system thus has an alternating current component, referred to as ripple current, which is associated with the occurrence of a magnetic field that changes over time.

The lower diagram of FIG. 5 shows the electrical control of a three-phase coil system having three coils 160. This type of control, which is based on center-aligned PWM, may be used with any of the three-phase systems 150 of the planar drive system 1 and may be implemented via the control loop described above with reference to FIG. 4. The three-phase system 150 is supplied with three drive voltages specified by the PWM clock frequency, and thus with three periodic voltage pulses 424 with different pulse widths or pulse durations. With reference to the three-phase system 150, these will be referred to hereinafter as second voltage pulses 421, third voltage pulses 422, and fourth voltage pulses 423. The three voltages have nearly rectangular curves with two voltage levels. The second voltage pulses 421 may refer to the first phase U, the third voltage pulses 422 to the second phase V and the fourth voltage pulses 423 to the third phase W of a three-phase drive current. In a corresponding manner, with reference to the three-phase system 150 shown in FIG. 4, it is e.g. possible for the first coil 165 to receive the second voltage pulses 421, the second coil 166 to receive the third voltage pulses 422, and the third coil 167 to receive the fourth voltage pulses 423.

The electrical control is performed in such a way that a second voltage pulse 421, a third voltage pulse 422 and a fourth voltage pulse 423 are center-aligned with respect to one another, and thus the centers of the respective voltage pulses 424 are superimposed. To illustrate this aspect, a second voltage pulse 421, a third voltage pulse 422 and a fourth voltage pulse 423 with different pulse heights are shown on the right side of the lower diagram of FIG. 5. The depiction with the different pulse heights only serves to emphasize the center-aligned arrangement of the second voltage pulse 421, third voltage pulse 422 and fourth voltage pulse 423. This is because second voltage pulses 421, third voltage pulses 422, and fourth voltage pulses 423 are applied to the coils 160 of the three-phase system 150 with matching voltage magnitudes during actuation, as is illustrated for the other second voltage pulses 421, third voltage pulses 422, and fourth voltage pulses 423 shown in FIG. 5.

In the lower diagram of FIG. 5, an electrical second current curve 431 is shown as may occur in one of the three coils 160 of the three-phase system 150 energized with the second voltage pulses 421, third voltage pulses 422 and fourth voltage pulses 423. This may e.g. be the first phase U of the three-phase drive current and, with reference to the three-phase system 150 shown in FIG. 4, the first coil 165. The second current curve 431 also has a triangular shape, due to a smoothing effect of the coil system, and oscillates back and forth about a mean value with the PWM clock frequency. An increase in the current amount occurs when all three drive voltages are not at the same (upper or lower) voltage level. If, on the other hand, the three voltages have the same voltage level, the current amount is reduced. The ripple current present in this case also leads to the occurrence of an alternating magnetic field.

The two other coils 160 of the three-phase system 150 have triangular current curves corresponding to the second current curve 431, which are affected by the ripple current. Here, too, an increase in the amount of current occurs in each case when all three drive voltages are not at the same voltage level, and otherwise a decrease in the amount of current occurs. At least one of the current curves may have an appearance inverse to the second current curve 431, i.e. that the current changes take place with an inverse sign with respect to the second current curve 431.

In an energized three-phase system 150 of the planar drive system 1, the drive currents flowing in the associated coils 160 are superimposed with a ripple current as described above. The occurrence of the ripple current is associated with a magnetic field that changes over time. This effect may be used to induce an alternating electrical voltage in the rotor coil 240 of a rotor 200.

According to FIG. 5, the first current curve 430 in the single-phase coil system may be equivalent to the second current curve 431 in the three-phase system 150. Therefore, the upper diagram of FIG. 5 may serve as an equivalence plot for the three-phase system 150, and the first current curve 430 may also refer to one of the three coils 160 of the three-phase system 150. In this sense, the first voltage pulses 410 may be considered as effective and current-amount-magnifying substitute pulses for the second voltage pulses 421, third voltage pulses 422 and fourth voltage pulses 423 actually applied to the three-phase system 150.

FIG. 5 further shows current measuring points 470 at which the coil systems may be sampled to obtain actual electrical current values 304. The periodic sampling is timed to match the pulse-width modulated periodic current, such that the current measuring points 470 are centered between successive first voltage pulses 410 or second voltage pulses 421, third voltage pulses 422 and fourth voltage pulses 423. This may be used to ensure that the actual current values 304 obtained by sampling correspond to the average value of the respective current. This approach allows for accurately controlling current.

The current control carried out in the planar drive system 1 according to the control loop shown in FIG. 4 may be performed in such a way that three-phase systems 150 to be energized are controlled in a pulse-width modulated manner according to FIG. 5 and are thereby energized. In this case, pulse-width modulated control signals 301 are generated by corresponding current controllers 170 using the target current values 300 specified by the main controller 500 and the actual current values 304 provided by one or a plurality of current measuring devices 172 by sampling, which are transmitted to the respective output stage devices 180 (cf. FIG. 4). In this way, voltage pulses 424 with predetermined duty cycles and pulse durations Ton are applied to the three-phase systems 150 to be energized, so that they are supplied with current. The average values of the electric currents flowing in the three-phase systems 150 are based on the target current values 300 specified by the main controller 500. A change in the target current values 300 may cause a change in the control signals 301 and thus in the duty cycles and pulse durations of the voltage pulses 424, which also causes the average values of the currents to change. Compared to the superimposed ripple current, such current changes may relate to much larger periods of time. Therefore, the current control may also be referred to as direct current control.

In operation of the planar drive system 1, multiple three-phase systems 150 may be energized simultaneously to drive one or a plurality of rotors 200. This may be controlled by the main controller 500 by the main controller 500 outputting corresponding target current values 300 for associated current controllers 170 (cf. FIG. 4). Pulse-width modulated energizing of multiple three-phase systems 150 may be synchronous in time or substantially synchronous in time. In operation, a rotor 200 may be in the area of influence of a plurality of three-phase systems 150 and may be subjected to the influence of a resultant alternating magnetic field formed by a superposition of a plurality of alternating magnetic fields, each caused by the ripple currents flowing in the three-phase systems 150. The alternating voltage induced in the associated rotor coil 240 may thereby be in accordance with the resulting alternating magnetic field generated by the plurality of three-phase systems 150.

As indicated above, the rotors 200 of the planar drive system 1 are assigned their own rotor identifiers. Furthermore, it is intended to carry out an identification of the rotors 200 based thereon during operation of the planar drive system 1. In this context, the following embodiments and details may be applied.

Figure 6:
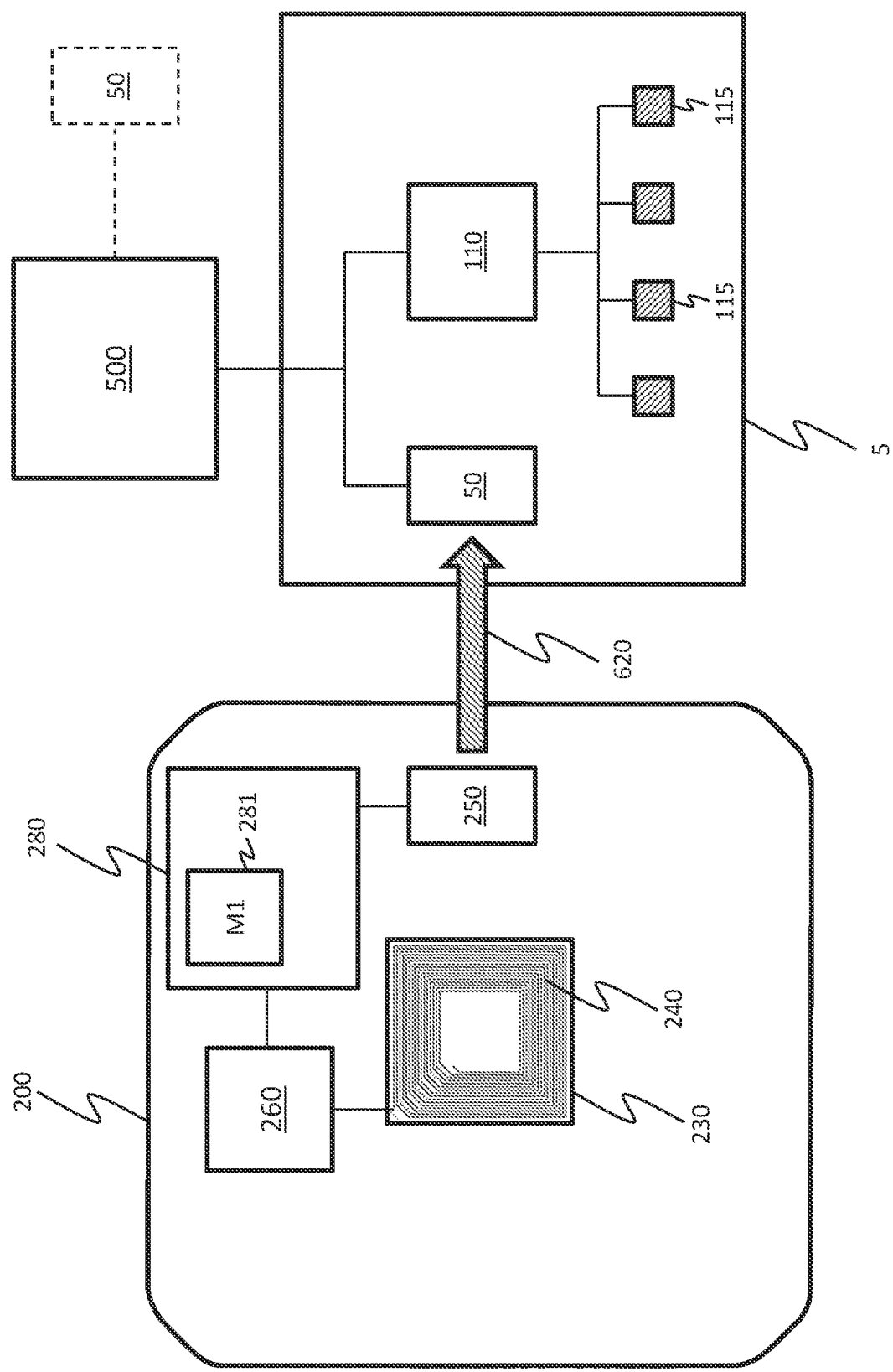
FIG. 6 is an illustration of a rotor and the stator, wherein the rotor is embodied for transmitting data by radio.

FIG. 6 shows a schematic depiction of the stator 5 and a rotor 200 of the planar drive system 1 according to a possible embodiment. The embodiment of the rotor 200 shown in FIG. 6 may apply to all rotors 200 of the planar drive system 1. The planar drive system 1 is embodied to transmit data from the rotor 200 to the main controller 500 by radio, inter alia. For this purpose, the rotor 200 has a radio transmitter 250, and a radio receiver 50 is further used. As shown in FIG. 6, the stator 5 may comprise the radio receiver 50. Here, the radio receiver 50 may be arranged at or in a stator module 10 of the stator 5. As has been described above, the main controller 500 is connected to the stator modules 10 of the stator 5 in such a way that data communication is possible between the main controller 500 and the stator modules 10. This applies in a corresponding manner to the radio receiver 50 of the stator 5. Insofar, data may be transmitted from the radio transmitter 250 of the rotor 200 to the radio receiver 50 of the stator 5, and then further transmitted from the radio receiver 50 of the stator 5 to the main controller 500.

FIG. 6 further illustrates, via dashed lines, an alternative embodiment which may be considered with regard to radio transmission. The radio receiver 50 used here is not a component of the stator 5, but instead a radio receiver 50 that is separate from or external to the stator 5 and may be located outside the stator 5. The external radio receiver 50 is connected to the main controller 500 in such a way that data communication is possible between the main controller 500 and the radio receiver 50. In this embodiment, as well, data may be transmitted from the radio transmitter 250 of the rotor 200 to the radio receiver 50, and further transmitted from the radio receiver 50 to the main controller 500.

If necessary, further processing or preparing of data may be carried out before it is forwarded to the main controller 500. This may e.g. be carried out via the radio receiver 50 used, or via a device of the stator 5. It is further possible that data received by the respective radio receiver 50 and forwarded to the main controller 500 is additionally or alternatively further processed by the main controller 500 itself.

With regard to identifying the rotor 200, the data transmission between the rotor 200 and the stator 5 or the (external) radio receiver 50 is used to transmit the rotor identifier assigned to the rotor 200 from the rotor 200 to the stator 5 or the radio receiver 50, and from there to the main controller 500. FIG. 6 shows that in this context the rotor 200 comprises a memory device 281 in which the rotor identifier is stored. As indicated in FIG. 6, the rotor 200 may e.g. have a first rotor identifier M1 associated therewith which is stored in the memory device 281. The memory device 281 may be a non-volatile memory device such as an EPROM memory (erasable programmable read-only memory).

The rotor 200 shown in FIG. 6 further comprises a controller 280. The controller 280, which may be realized in the form of a microcontroller, serves to control the radio transmitter 250, and thus to control the data transmission from the rotor 200 to the stator 5 or the radio receiver 50. Via the controller 280, the radio transmitter 250 may be controlled to transmit and thereby transfer the rotor identifier stored in the memory device 281 to the radio receiver 50. As shown in FIG. 6, the memory device 281 may be integrated in the controller 280, or alternatively may be suitably connected to the controller 280.

In accordance with the above description of FIG. 3, the rotor 200 shown in FIG. 6 further comprises a first printed circuit board 230 having a rotor coil 240 in which an alternating electric voltage may be induced during operation of the stator 5 due to the ripple current flowing in energized stator conductors 125 or in one or a plurality of three-phase systems 150 and the alternating magnetic field generated thereby. In addition, the rotor 200 comprises a rectifier 260. Via the rectifier 260, which is electrically connected to the rotor coil 240, and which may further be associated with a smoothing capacitor, the induced alternating voltage may be converted into a direct voltage. The direct voltage may be used to electrically power the controller 280, as well as the radio transmitter 250 of the rotor 200. The rotor 200 may further comprise a voltage regulator in the form of a series regulator or a switching regulator. Furthermore, the rectifier 260 may optionally be in the form of a voltage doubler circuit. It is possible that one or a plurality of the aforementioned components, such as the rectifier 260, the controller 280, and the radio transmitter 250, are components of the first circuit board 230 of the rotor 200 and/or are arranged on the first circuit board 230.

FIG. 6 further illustrates the position detecting system mentioned above and used to detect the positions of the rotors 200 on the stator 5. The position detecting system comprises a plurality of distributed magnetic field sensors 115, and at least one processing device 110. The magnetic field sensors 115 and the processing device 110 are arranged on the stator 5 and are components of the stator 5. The data communication between the main controller 500 and the stator 5 described above includes the processing device 110. The magnetic field sensors 115, of which a larger number may be provided in deviation from the schematic representation in FIG. 6, may e.g. be Hall sensors. With the magnetic field sensors 115, the magnetic fields generated by the magnet devices 204 of the rotors 200 (cf. FIG. 3) may be detected, and based on this, the positions of the rotors 200 may be inferred. During operation of the planar drive system 1, the magnetic field sensors 115 may generate sensor signals that reflect the positions of the rotors 200. The processing device 110 may process sensor signals from magnetic field sensors 115 and provide corresponding sensor data, which may be transmitted to the main controller 500. The received sensor data may be further processed by the main controller 500. In this way, position information of the rotors 200 may be provided. As described above, this information is taken into account by the main controller 500 when driving the stator 5 to drive the rotors 200.

With reference to the above-described embodiment of the stator 5 having a plurality of stator modules 10 (cf. FIG. 1), each stator module 10 may have a plurality of distributed magnetic field sensors 115. Furthermore, each stator module 10 may comprise a processing device 110 for processing sensor signals from the magnetic field sensors 115 of the respective associated stator module 10, and for providing and forwarding sensor data to the main controller 500.

Identification of the rotors 200 of the planar drive system 1 is carried out by providing position information of the rotors 200 and the rotor identifiers of the rotors 200, which may be performed in cooperation with the main controller 500 as described above, whereupon the main controller 500 links the position information with the rotor identifiers. This may be carried out as described below.

In a possible method carried out for the purpose of identifying the rotors 200 of the planar drive system 1, the current positions of the rotors 200 are detected via the position detecting system in order to provide position information of the rotors 200. Furthermore, the rotors 200 are activated in such a way that the rotors 200 consecutively transmit their respective rotor identifier to the stator 5 or to an (external) radio receiver 50. From this, the rotor identifiers are forwarded, also in a consecutive manner, to the main controller 500. For activating the rotors 200, an alternating magnetic field activating the rotors 200 for transmitting the rotor identifiers is generated consecutively via the stator 5 at those positions at which the rotors 200 are located, and an alternating voltage is thereby induced in the rotor coil 240 of the rotors 200. The generation of the activating alternating magnetic field is carried out by appropriately energizing stator conductors 125 or three-phase systems 150 of the stator 5 at the positions of the rotors 200, which is performed by the main controller 500, using the position information of the rotors 200, by appropriately driving the stator 5. The rotor identifiers provided in this way in a consecutive manner may be uniquely and reliably linked to the position information of the rotors 200 by the main controller 500.

According to the embodiment shown in FIG. 6, the rotors 200 comprise a controller 280. The controller 280 may be supplied with electrical energy by the alternating voltage induced in the rotor coil 240 of the associated rotor 200, and the direct voltage provided therefrom by rectifying.

The generation of the activating alternating magnetic field at the positions of the rotors 200 in the identification process may therefore initiate the power supply of the controller 280 of the rotors 200 in each case. In this context, the controller 280 of each rotor 200 may be embodied to initiate the transmission of the rotor identifier, which according to FIG. 6 is carried out by appropriately triggering the radio transmitter 250 of the respective rotor 200, as soon as the power supply starts due to the voltage induction in the rotor coil 240.

By performing the generation of the activating alternating magnetic field in a sequential manner at the positions of the rotors 200, energizing of the controllers 280 of the rotors 200 may also be initiated in a consecutive manner. In a corresponding manner, the controllers 280 may consecutively initiate transmission of the rotor identifiers by radio transmission to the stator 5 and the radio receiver 50, respectively, wherein they may be consecutively transmitted to the main controller 500. The rotor identifiers thus consecutively reaching the main controller 500 may be unambiguously associated by the main controller 500 with the position information of the rotors 200.

To further illustrate the identification procedure described above, FIG. 7A shows a correspondingly executed process sequence. The process sequence shown relates to an arrangement of the planar drive system 1 with two rotors 200, according to FIG. 7B, as also shown in FIG. 1. For the purpose of differentiation, the two rotors 200 are also referred to below as first rotor 201 and second rotor 202 in FIG. 7B. The first rotor 201 is assigned a first rotor identifier M1, and the second rotor 202 is assigned a second rotor identifier M2. The first rotor identifier M1 and second rotor identifier M2 are stored in the memory device 281 (cf. FIG. 6) of the respective first rotor 201 and second rotor 202.

Figure 7B:
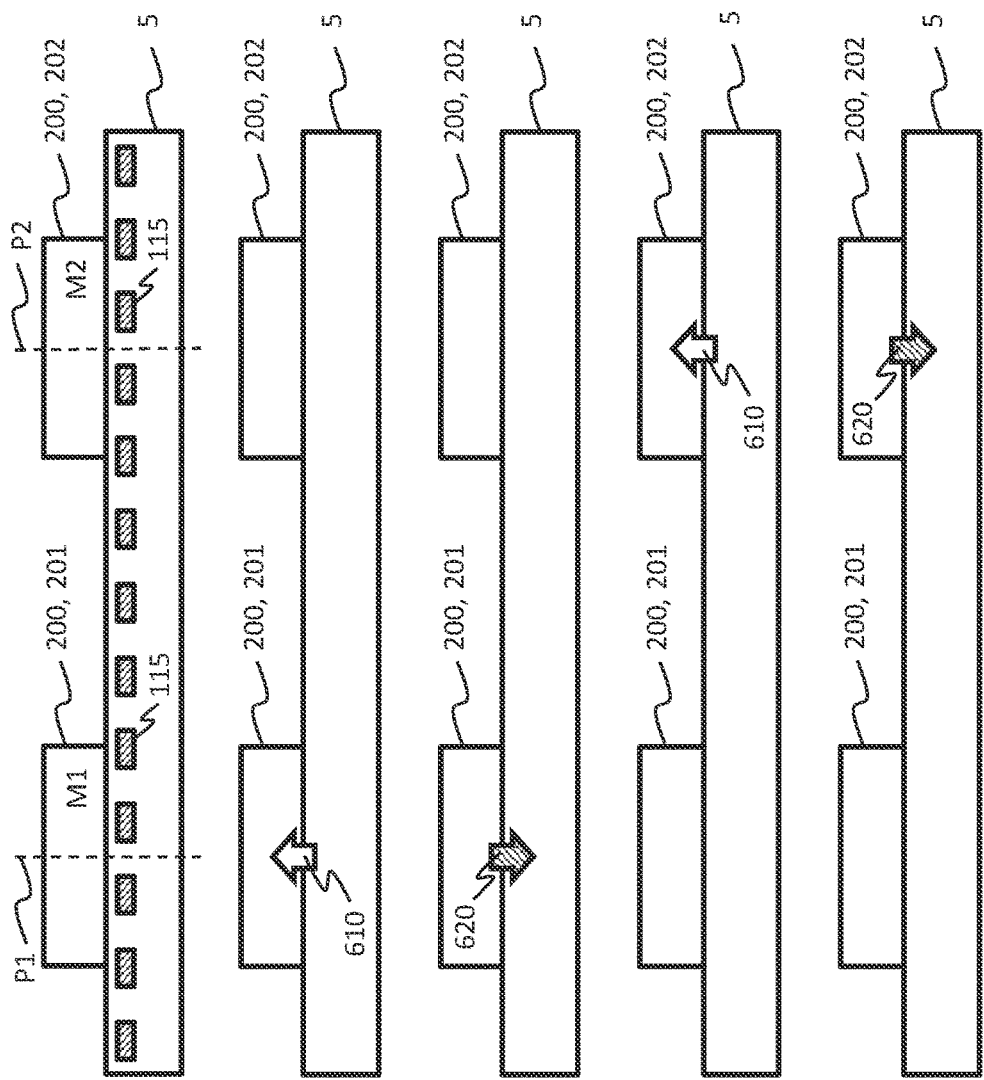
FIG. 7B shows a planar drive system for the procedure of FIG. 7A.
Figure 7A:
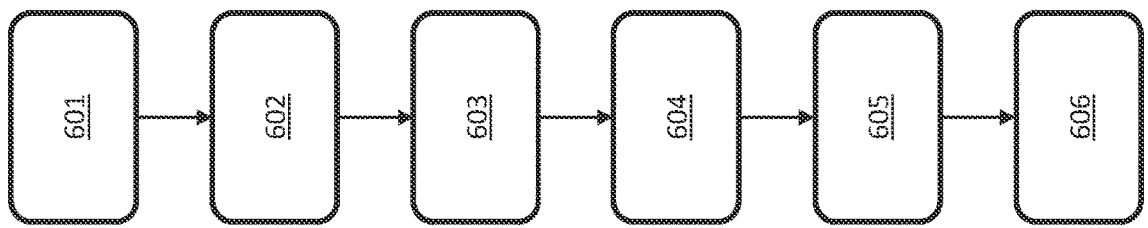
FIG. 7A shows a procedure for identifying rotors of the planar drive system.

As shown in FIGS. 7A and 7B, in a first step 601 the lateral positions of the first rotor 201 and second rotor 202 on the stator 5 are detected. The first rotor 201 is located at a first position P1, and the second rotor 202 is located at a second position P2. The position detection is performed using the position detecting system of the stator 5 comprising the magnetic field sensors 115. In this way, information about the current first position P1 and the current second position P2 of the first rotor 201 and second rotor 202 is provided.

According to FIGS. 7A and 7B, in a subsequent second step 602, which serves for activation, a current supply to stator conductors 125 or three-phase systems 150 of the stator 5 at the first position P1 of the first rotor 201 is initiated by the main controller 500 (by outputting target current values 300, cf. FIG. 4). As indicated in FIG. 7B by a first arrow 610, this leads to an inductive transfer of energy from the stator 5 to the first rotor 201. Associated with this is an initiation of the energy supply of the controller 280 (cf. FIG. 6) of the first rotor 201. As shown in FIGS. 7A and 7B, this has the consequence that in a third step 603 a transmission of the first rotor identifier M1 (second arrow 620) of the first rotor 201 to the stator 5 or to the radio receiver 50 is initiated by the controller 280 of the first rotor 201, which is then forwarded by the stator 5 or the radio receiver 50 to the main controller 500.

Correspondingly, according to FIGS. 7A and 7B, in a subsequent fourth step 604, which is used for activation, stator conductors 125 or three-phase systems 150 at the second position P2 of the second rotor 202 are energized by the main controller 500, resulting in an inductive energy transfer from the stator 5 to the second rotor 202 (first arrow 610). This is connected with an initiation of the power supply of the controller 280 (cf. FIG. 6) of the second rotor 202. According to FIG. 7B, this leads to a transmission of the second rotor identifier M2 (second arrow 620) of the second rotor 202 to the stator 5 or to the radio receiver 50 initiated by the controller 280 of the second rotor 202 in a fifth step 605 (according to FIG. 6 by radio transmission), which is then transmitted from the stator 5 or the radio receiver 50 to the main controller 500.

In a subsequent sixth step 606 of the process sequence shown in FIGS. 7A and 7B, the position information, i.e. information on the first position P1 and second position P2, and the first rotor identifier M1 and second rotor identifier M2 of the first rotor 201 and second rotor 202 are linked to each other by the main controller 500. Here, information on the first position P1 is respectively associated with the first rotor identifier M1, and information on the second position P2 is respectively associated with the second rotor identifier M2. In this way, the first rotor 201 and second rotor 202 may be uniquely identified and distinguished from each other by the main controller 500.

With reference to the method described above, it is possible to carry out energizing of three-phase systems 150 of the stator 5 at the positions of the rotors 200 for activating them to transmit the rotor identifiers (second step 602 and fourth step 604 in FIG. 7A) in such a way that the rotors 200 are held stationary on the stator 5. It is e.g. possible that the rotors 200 are actively attracted to the stator 5 due to the magnetic fields generated by the stator 5 in this process. In this way, the rotors 200 may be reliably fixed on the stator 5 during identification.

Furthermore, it is possible that energizing of three-phase systems 150 at the positions of the rotors 200 and thus the power supply of the rotors 200 is not terminated after the activation of the rotors 200 for the transmission of the rotor identifiers (second step 602 and fourth step 604 in FIG. 7A), but is instead maintained by continuing to energize the three-phase systems 150 at these positions. Also, the rotors 200 may subsequently be moved or moved away from the previous stationary positions by appropriately energizing three-phase systems 150 of the stator 5.

It is further noted that the position detection of the rotors 200 may be carried out not only once or at the beginning of the process sequence, as shown in FIG. 7A via the first step 601, but instead may be carried out several times or continuously during the operation of the planar drive system 1. Also, linking position information of the rotors 200 and rotor identifiers, as illustrated in FIG. 7A with reference to the sixth step 606, may be performed not only at the end of the identification procedure by the main controller 500. The linking of position information with a rotor identifier may in each case be carried out after the rotor identifier has been received or provided. If, in contrast to FIG. 7B (and also FIG. 1), a larger number of rotors 200 are used in the planar drive system 1, a larger number of activation steps (second step 602 and fourth step 604 in FIG. 7A) and steps for transmitting the rotor recognition (third step 603 and fifth step 605 in FIG. 7A) are performed accordingly.

The identification of the rotors 200 of the planar drive system 1 may be carried out at each system start or system restart of the planar drive system 1. In this way, at the beginning of the respective operation of the planar drive system 1, a unique assignment and identification of the rotors 200 may be performed. In this way, for example, in the event that one or a plurality of rotors 200 are moved or interchanged in a switched-off state of the planar drive system 1, or during a power failure, improper or faulty operation of the planar drive system 1 may be avoided.

Following the identification of the rotors 200, the further operation of the planar drive system 1 may be carried out via the main controller 500 by driving or moving individual rotors 200, a plurality of rotors 200, or all of the rotors 200 by appropriately driving the stator 5 by the main controller 500. Since the rotors 200 are identified, the operation of the planar drive system 1 may be performed with a high degree of reliability and accuracy.

In this context, it is further possible that the main controller 500 performs the control of the stator 5 for driving at least one rotor 200 on the basis of an individualized parameter set adapted to the rotor 200. It is also possible to perform the driving of a plurality of or all of the rotors 200 of the planar drive system 1 on the basis of individualized parameter sets associated with the rotors 200. In this way, the driving of the relevant rotor(s) 200 may be performed with a high degree of accuracy. The individualized parameter sets may be associated with the rotor identifiers, and thus with the rotors 200. Identifying rotors 200 here enables the main controller 500 to assign its associated parameter set to an identified rotor 200, and thereby based on the parameter set to control the stator 5 to drive the rotor 200. Further details on this will be described in more detail below.

In the following, further possible variants and embodiments are described which may be considered with respect to the planar drive system 1 and the identification method. Matching features and details as well as identical and equally acting components will not be described in detail again in the following. Instead, for details, reference is made to the above description in this regard. Furthermore, aspects and details mentioned with respect to one embodiment may also be applied with respect to another embodiment, and features of two or more embodiments may be combined.

A data transmission for transmitting the rotor identifiers of the rotors 200 may be realized not only by radio, but also in other ways. For example, the application of a load modulation is possible. In this context, the rotors 200 may be configured to temporarily electrically load the associated rotor coil 240. By loading the rotor coil 240 of a rotor 200, energy may be extracted or extracted in an amplified form from the alternating magnetic field generated by the pulse-width modulated energization of three-phase systems 150 of the stator 5. This is associated with an increase in current consumption from energized three-phase systems 150 of the stator 5. Intermittent or pulse-shaped loading of the rotor coil 240 may cause intermittent or pulse-shaped increased current consumption at the stator 5, and based thereon, data signals may be transmitted from the rotor 200 to the stator 5. By detecting the increased current consumption, which may be done in the context of measuring a summation current 314 (cf. FIG. 9) of energized three-phase systems 150, and by performing an evaluation, conclusions may be drawn about the data signals generated by the rotor 200.

Figure 8:
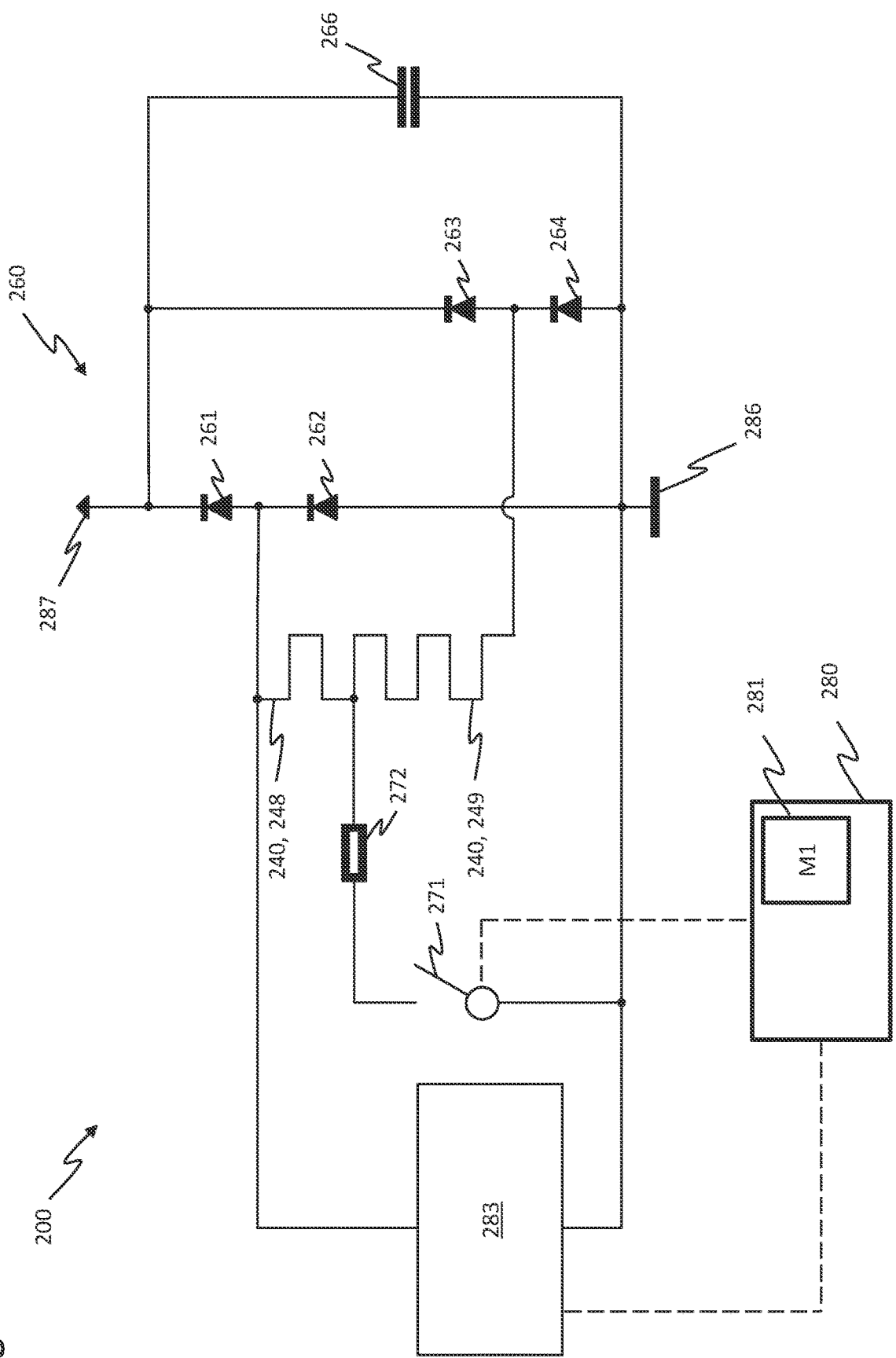
FIG. 8 shows a rotor which is embodied to short-circuit a coil part of a rotor coil.

For illustrative purposes, FIG. 8 shows a possible configuration of a rotor 200 via a circuit arrangement. The configuration shown in FIG. 8 may apply to all the rotors 200 of the planar drive system 1. As described above, the rotor 200 has a rotor coil 240 in which an alternating electric voltage may be induced due to the pulse-width-modulated energization of three-phase systems 150 of the stator 5 and the associated evocation of an alternating magnetic field. The rotor coil 240 may be integrated in a first printed circuit board 230 (cf. FIG. 3). Further components of the rotor 200 shown in FIG. 8 are a rectifier 260 connected to the rotor coil 240 and a smoothing capacitor 266 connected to the rectifier 260. The rectifier 260, which is realized in the present case in the form of a bridge rectifier, comprises a first diode 261, a second diode 262, a third diode 263 and a fourth diode 264. Via the rectifier 260, the alternating voltage induced in the rotor coil 240 may be converted into a direct voltage. The smoothing capacitor 266 is used to smooth the direct voltage.

The smoothed direct voltage generated by the rectifier 260 and the smoothing capacitor 266 may be applied between a first connection 286 and a second connection 287, which are connected to the rectifier 260 and the smoothing capacitor 266, according to the circuit arrangement shown in FIG. 8. The first connection 286 may be a ground connection. The direct voltage may be used to power at least one other device.

According to the embodiment shown in FIG. 8, the rotor 200 is embodied to short-circuit a coil portion of the rotor coil 240 for carrying out the load modulation by temporarily electrically loading the rotor coil 240. In this way, it may be achieved that during the loading, the alternating voltage induced in the rotor coil 240 only partially collapses, and thus an inductive energy transfer from the stator 5 to the rotor 200 is maintained.

As shown in FIG. 8, the rotor coil 240 includes a first coil portion 248 and a second coil portion 249, the second coil portion 249 being used for intermittent short-circuiting. The rotor 200 further comprises a load resistor 272 connected to the rotor coil 240, and a switching device 271 connected to the load resistor 272 and to the first connection 286. The switching device 271 may be implemented in the form of a transistor. By closing the switching device 271, the second coil portion 249 of the rotor coil 240 may be short-circuited via the load resistor 272. Referring to FIG. 8, the second coil portion 249 or its ends are connected to the first connection 286 which serves as a ground connection. The short-circuiting of the second coil portion 249 is associated with effects such as a change in impedance and an occurrence of an eddy current, so that, as described above, an increased energy extraction from the alternating magnetic field of the stator 5 and thus an increased current consumption of energized three-phase systems 150 of the stator 5 may be caused. By opening the switching device 271, the short circuit of the second coil portion 249 may be cancelled again, and in this respect the presence of the increased current consumption at the stator 5 may be terminated again.

As shown in FIG. 8, the rotor 200 further comprises a controller 280 connected to the switching device 271. The controller 280, which may be implemented in the form of a microcontroller, is used to control the switching device 271, and thus to control the transmission of data from the rotor 200 to the stator 5. The controller 280 may be supplied with electrical energy via the direct voltage provided by the rectifier 260. Via the controller 280, the switching device 271 may be controlled periodically or in a pulse-wise manner to short-circuit the second coil portion 249 of the rotor coil 240 in such a way that corresponding data signals are generated by the rotor 200 and transmitted to the stator 5. The rotor 200 shown in FIG. 8 further comprises, according to FIG. 6, a memory device 281 in which the rotor identifier associated with the rotor 200 (e.g., the first rotor identifier M1 as shown) is stored. The memory device 281 may be part of the controller 280 or suitably connected to the controller 280.

As shown in FIG. 8, the rotor 200 may further include a voltage measuring device 283 connected to the rotor coil 240. The voltage measuring device 283 may be used to measure the alternating voltage induced in the rotor coil 240, and corresponding measuring signals may be transmitted to the controller 280. This embodiment may be used with respect to data transmission from the stator 5 to the rotors 200, as will be discussed in more detail below with reference to FIGS. 10 and 11. With reference to the circuit arrangement shown in FIG. 8, it is possible that rotor components shown here, such as the rectifier 260, the smoothing capacitor 266, the load resistor 272, the switching device 271, the controller 280 and the voltage measuring device 283, are components of the first printed circuit board 230 (cf. FIG. 3) of the rotor 200 concerned and/or are arranged on the first printed circuit board 230.

For the stator 5 of the planar drive system 1, with regard to the data transmission from the rotors 200 to the stator 5 via load modulation, the embodiment described below may be applied in order to be able to detect and evaluate the increased current consumption of energized three-phase systems 150 caused by the loading of a rotor coil 240 of a rotor 200.

Figure 9:
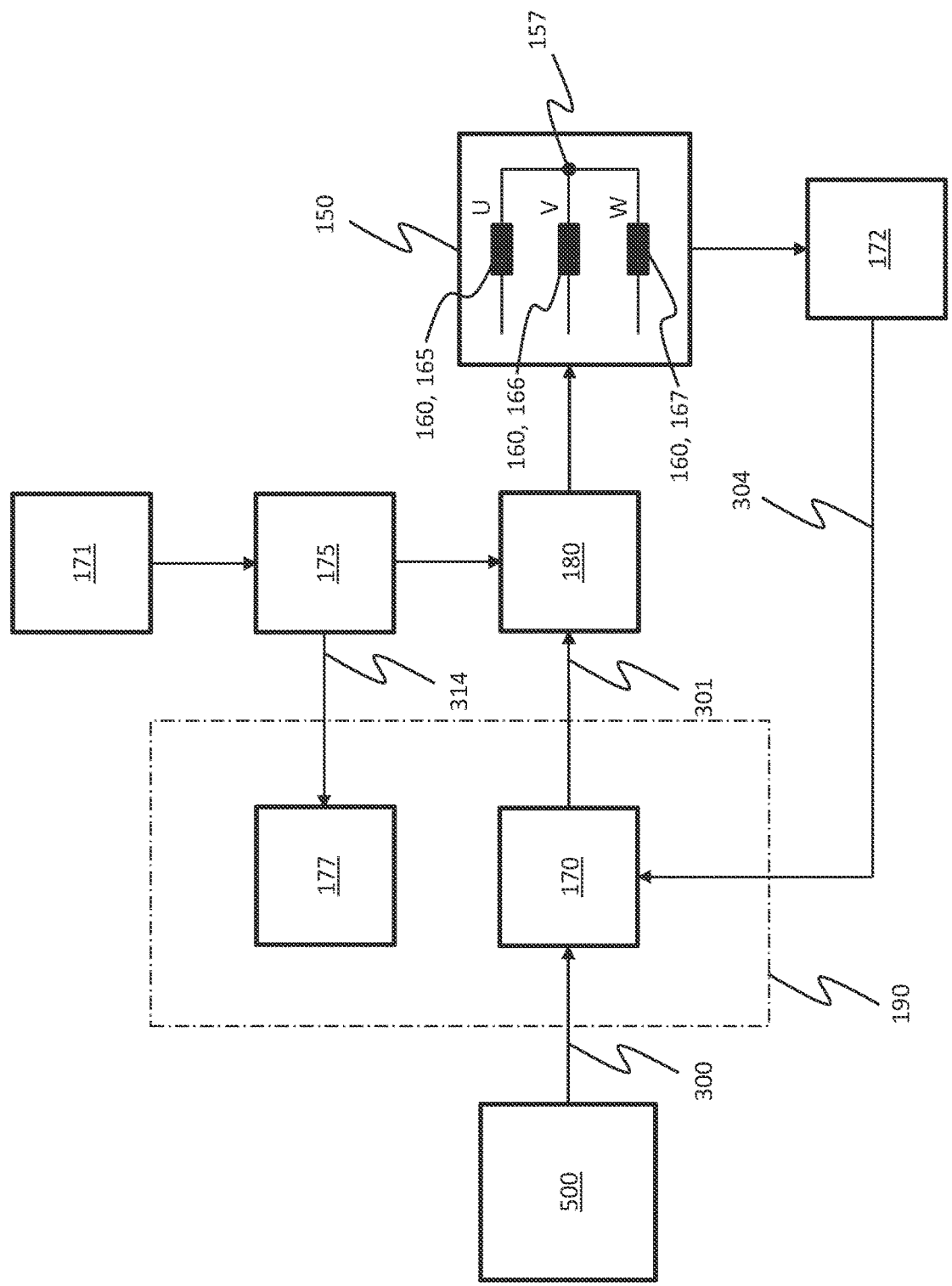
FIG. 9 shows a further control loop for current control of a coil system of the stator, the stator having a summation current measuring device and an evaluating device.

FIG. 9 shows a block diagram of a further control loop for current control of a three-phase system 150 of a stator module 10, as may be provided in the planar drive system 1. The control loop is based on the control loop shown in FIG. 4 and comprises, in addition to the main controller 500 of the planar drive system 1, components described above such as a module controller 190, a current controller 170, an output stage device 180, an intermediate circuit 171, a three-phase system 150 and a current measuring device 172. With regard to details of these components, reference is made to the above description of FIG. 4. According to FIG. 9, a summation current measuring device 175 and an evaluating device 177 are used, as well. The summation current measuring device 175 and the evaluating device 177 are components of the stator 5 or of a stator module 10 of the same. Each stator module 10 has a summation current measuring device 175 and an evaluating device 177.

As shown in FIG. 9, the summation current measuring device 175 is located between the intermediate circuit 171 and the output stage device 180. With respect to the above-described embodiment of a stator module 10 having an intermediate circuit 171 and a plurality (i.e., twenty-four) of output stage devices 180, the summation current measuring device 175 is located between the intermediate circuit 171 and all of the output stage devices 180 of the stator module 10 in question, and is connected to the intermediate circuit 171 and the output stage devices 180. As described above, the output stage devices 180 and thus the three-phase systems 150 are supplied with electrical energy from the intermediate circuit 171 of the stator module 10. Consequently, the summation current measuring device 175 may be used to measure the summation current 314 of energized three-phase systems 150 of the stator module 10. As was also described above, a plurality of three-phase systems 150 may be energized simultaneously. In this respect, the summation current 314 may refer to the current consumption of the plurality of simultaneously energized three-phase systems 150 within the respective stator module 10.

The summation current measuring device 175 is further connected to the evaluating device 177, as shown in FIG. 9.

The evaluating device 177 is embodied to process and evaluate the summation current 314 measured via the summation current measuring device 175. Within the scope of the evaluation, evaluation signals or evaluation data may be provided by the evaluating device 177, which reproduce the data signals generated by a rotor 200 by temporarily loading the rotor coil 240. The evaluating device 177 may be part of the module controller 190 of the relevant stator module 10. It is possible to additionally provide a filter or bandpass filter between the summation current measuring device 175 and the evaluating device 177, via which interference may be filtered out.

As described above, the main controller 500 is connected to the stator modules 10 of the stator 5 in such a way that data communication is possible between the main controller 500 and the stator modules 10 (cf. FIG. 1). This includes the evaluating devices 177 of the stator modules 10. As a result, data may be communicated from a rotor 200 to the stator 5 by temporarily loading the rotor coil 240, and from the stator 5 further on to the main controller 500 by passing corresponding evaluation data from one or a plurality of evaluating devices 177 of the stator 5 to the main controller 500. The evaluation data may be further processed by the main controller 500. In this way, the data signals generated by the respective rotor 200 may be determined.

For the transmission of the rotor identifier of a rotor 200 stored in the memory device 281 (cf. FIG. 8) to the stator 5, the temporary loading of the rotor coil 240 may be effected in such a way that the increased current consumption temporarily caused thereby in the stator 5 is modulated in a manner reflecting the rotor identifier. This may be controlled by the associated controller 280 of the rotor 200, in that the controller 280 activates the switching device 271 of the rotor 200 periodically or in pulses to short-circuit the second coil portion 249 in a manner matched to the rotor identifier (cf. FIG. 8). By measuring the summation current 314 of energized three-phase systems 150 of the stator 5 and evaluating the same via one or a plurality of summation current measuring devices 175 and one or a plurality of evaluating devices 177 of the stator 5 (cf. FIG. 9), evaluation data reproducing the rotor identifier may be generated, which are transmitted to the main controller 500 and which may be further processed by the main controller 500. In this way, the rotor identifier may be made available.

In the identification method described above and illustrated in FIGS. 7A and 7B, in addition to providing position information of the rotors 200, it is provided to activate the rotors 200 in such a way that the rotors 200 consecutively transmit their respective rotor identifier. In order to activate the rotors 200, an alternating magnetic field that activates the rotors 200 to transmit the rotor identifier is generated consecutively via the stator 5 at the positions at which the rotors 200 are located, and an alternating voltage is thereby induced in the rotor coil 240 of the rotors 200.

According to the embodiment shown in FIG. 8, the rotors 200 have a controller 280 which may be supplied with electrical energy by the alternating voltage induced in the rotor coil 240 and the direct voltage generated therefrom. Insofar, also in this embodiment, the generation of the activating alternating magnetic field at the positions of the rotors 200 may initiate the power supply to the controller 280 of the rotors 200. In this context, the controller 280 of each rotor 200 may be embodied to initiate the transmission of the rotor identifier, which is performed according to FIG. 8 by appropriately triggering the switching device 271 of the respective rotor 200 as soon as the power supply starts due to the voltage induction in the rotor coil 240.

By generating the activating alternating magnetic field consecutively at the positions of the rotors 200 (second step 602 and fourth step 604 in FIG. 7A), the power supply to the controllers 280 of the rotors 200 may also be initiated consecutively. Similarly, the controllers 280 of the rotors 200 may consecutively initiate the transmission of the rotor identifiers to the stator 5 (third step 603 and fifth step 605 in FIG. 7A), in this case by loading the rotor coil 240 (cf. FIG. 8). Starting from the stator 5, the rotor identifiers, in the form of the evaluation data provided by the evaluating devices 177 (cf. FIG. 9), may be consecutively forwarded to the main controller 500. The main controller 500 may unambiguously link the rotor identifiers that are thus forwarded to the main controller 500 one after the other with the position information of the rotors 200.

The sequential activation of the rotors 200 for transmitting the rotor identifier to the stator 5 may be effected not only by consecutively initiating the power supply of a controller 280 of the rotors 200, but also in other ways. For example, it is possible to perform energizing stator conductors 125 or three-phase systems 150 of the stator 5 to generate the activating alternating magnetic field at the positions of the rotors 200 and thereby induce an alternating voltage in the rotor coil 240 of the rotors 200 in such a manner that an activation command is thereby transmitted to the rotors 200 in a consecutive manner. For this purpose, the planar drive system 1 may be configured as follows in order to allow for data being transmitted from the stator 5 to the rotors 200.

Data communication from the stator 5 to the rotors 200 may be based on intermittently affecting the energization of one or a plurality of energized three-phase systems 150 of the stator 5. This may cause a change with respect to the alternating magnetic field generated by the stator 5, and thereby to the alternating voltage induced in the rotor coil 240 of a rotor 200. By intermittent or pulse-wise influencing of the current, an intermittent or pulse-wise change in the induction voltage in the rotor coil 240 of a rotor 200 may be caused, and based thereon data signals may be transmitted from the stator 5 to the respective rotor 200. By measuring the induction voltage, which may be done via a voltage measuring device 283 (cf. FIG. 8), and by performing an evaluation, conclusions may be drawn about the data signals generated by the stator 5.

Figure 10:
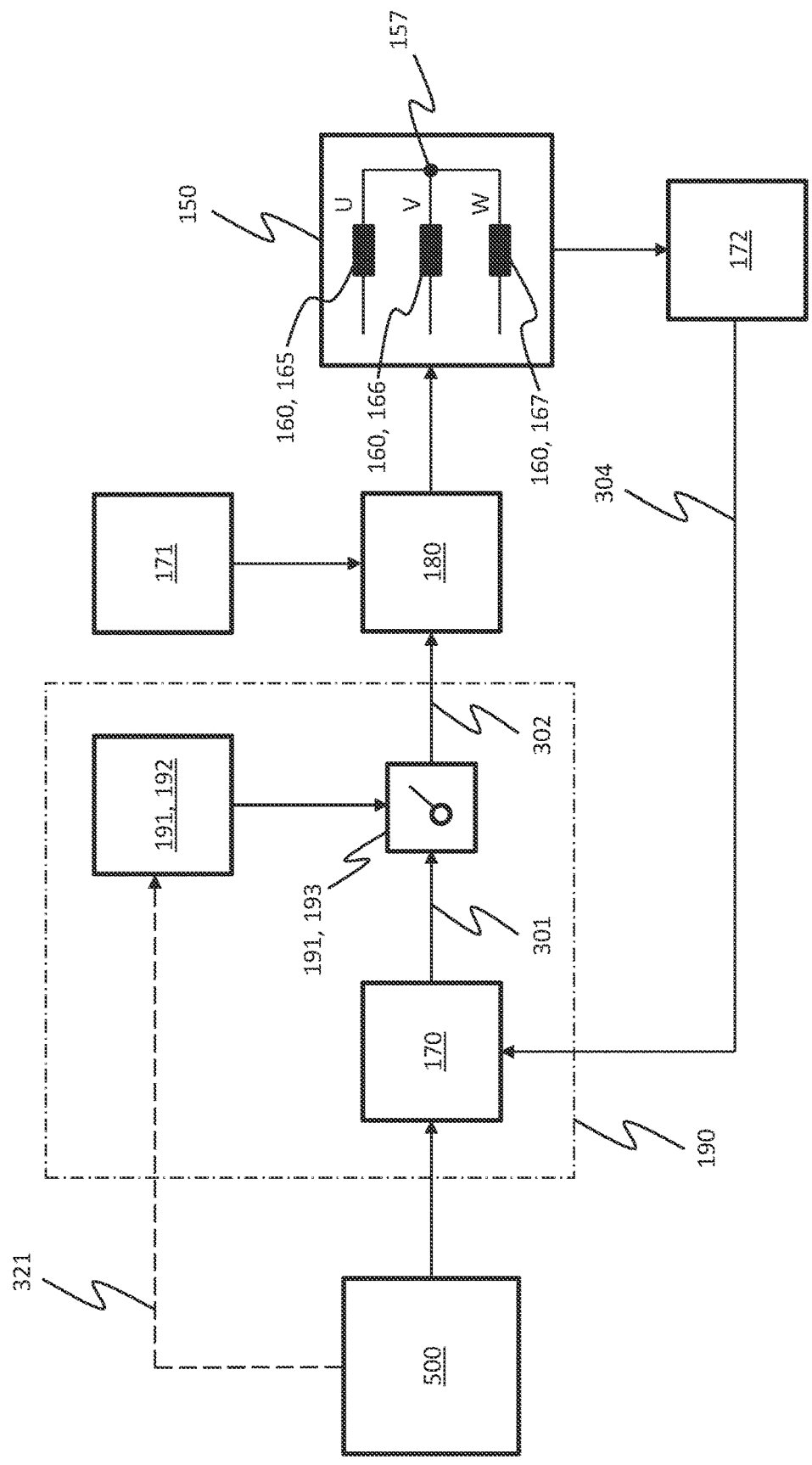
FIG. 10 shows a further control circuit for current control of a coil system of the stator, the stator having an influencing device for influencing the current control.

By way of illustration, FIG. 10 shows a block diagram of a further control loop for current control of a three-phase system 150 of a stator module 10, as may be provided in the planar drive system 1 for transmitting data from the stator 5 to the rotors 200. The control loop is based on the control loop shown in FIG. 4 and includes, in addition to the main controller 500 of the planar drive system 1, components described above such as a module controller 190, a current controller 170, an output stage device 180, an intermediate circuit 171, a three-phase system 150 and a current measuring device 172. Further components described on the basis of the control circuit of FIG. 9, such as a summation current measuring device 175 and an evaluating device 177, which may be used in the context of data transmission from the rotors 200 to the stator 5 and which may be present in a corresponding manner in the control circuit of FIG. 10, are omitted in FIG. 10 for the sake of clarity. With regard to details of the components already described, reference is made to the above description of FIGS. 4 and 9.

According to FIG. 10, an influencing device 191 is used, as well, which may be part of the module controller 190. The influencing device 191 is used to temporarily influence the current control of the three-phase system 150. The influencing device 191 may be controlled by the main controller 500 of the planar drive system 1 and thereby activated and put into operation. When the influencing device 191 is not activated, the current control of the three-phase system 150 is carried out in the manner described above, as described with reference to FIG. 4.

In contrast, in the operation of the influencing device 191 used for transmitting data, the current control of the three-phase system 150 is temporarily influenced in such a way that the occurrence of the ripple current in the three-phase system 150 is temporarily suppressed. In this way, it may be achieved that the generation of an alternating magnetic field associated with the ripple current and thus the induction of an alternating voltage in the rotor coil 240 of a rotor 200 is temporarily suppressed or substantially suppressed. As a result of the interference, no induced voltage or only a small or negligible induced voltage is thus generated in the rotor coil 240.

According to the embodiment shown in FIG. 10, the influencing device 191 comprises a data controller 192 and an interrupting device 193. Via the interrupting device 193, the transmission of control signals 301 output by the current controller 170 for the output stage device 180 is temporarily interrupted so that the control signals 301 are no longer applied to the output stage device 180. This serves the purpose of causing an influenced mode of operation of the output stage device 180 and thus of the three-phase system 150, in which the occurrence of the ripple current in the three-phase system 150 as indicated above temporarily ceases. For this purpose, as shown in FIG. 10, modified control signals 302 may be generated by the interrupting device 193 and applied to the output stage device 180.

The interruption of the control signals 301 generated by the current controller 170 and the output of modified control signals 302 effected via the interrupting device 193 is controlled by the data controller 192 of the influencing device 191, which controls the interrupting device 193 for this purpose and applies corresponding control signals to the interrupting device 193. This process is initiated by the main controller 500 of the planar drive system 1, which transmits to the data controller 192 data control signals 321 relating to the data transmission from the stator 5 to the rotor 200. Based on the data control signals 321, the data controller 192 controls the interrupting device 193 accordingly to thereby temporarily cause suppression of the ripple current in the three-phase system 150.

Figure 11:
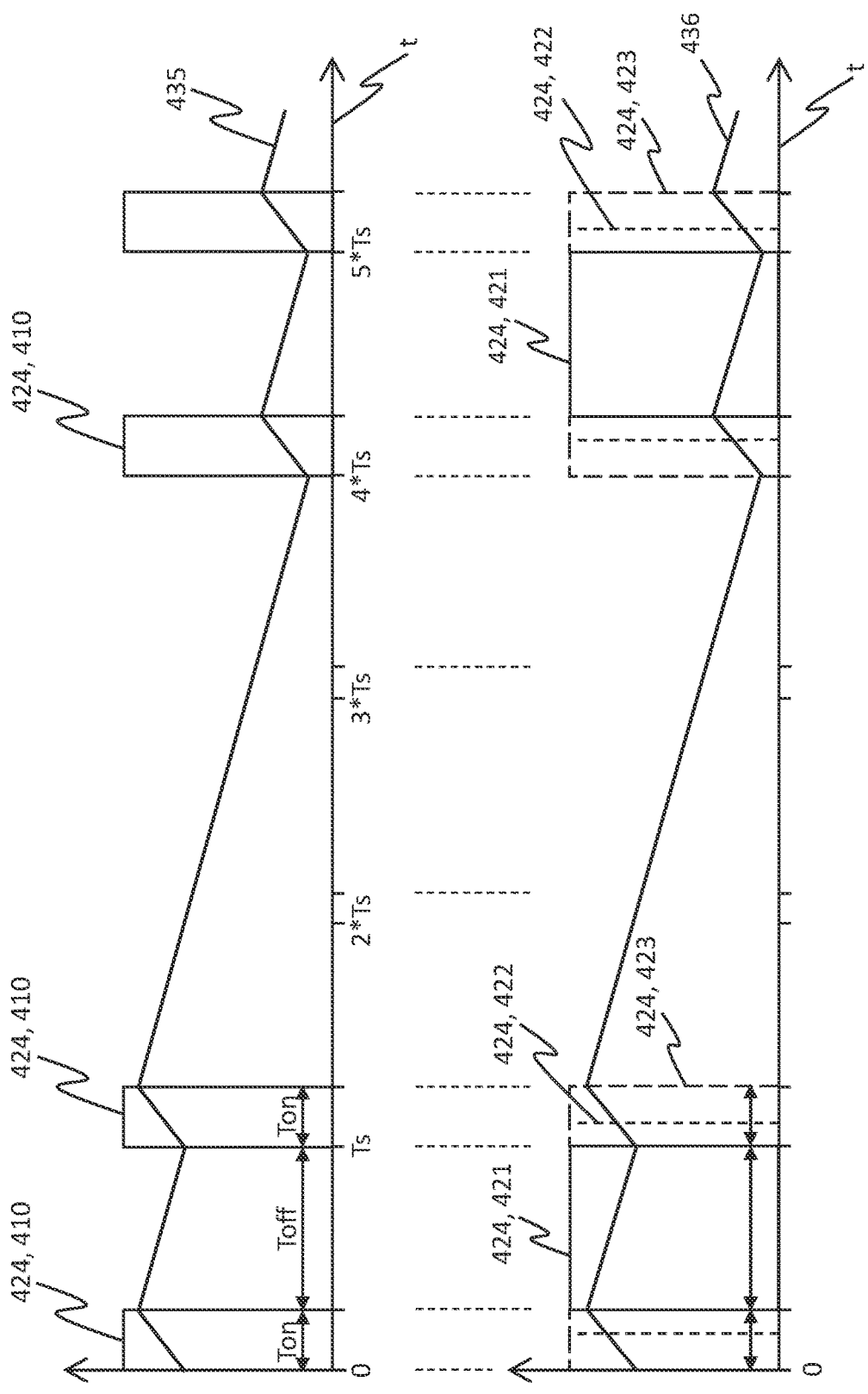
FIG. 11 shows voltage and current curves over time for pulse-width modulated energization of a coil system, wherein an influence by the influencing device is shown.

To illustrate a temporary influence of the current control, FIG. 11 shows possible electrical voltage and current characteristics as a function of time t, as they may occur with a pulse-width modulated electrical control of coil systems, including an influence that may be achieved via the influencing device 191. The upper diagram of FIG. 11, corresponding to FIG. 5, shows, for simplicity, conditions for driving a single-phase coil system with only one coil 160. The upper diagram of FIG. 11 may also serve here as an equivalent representation for a three-phase coil system. The lower diagram of FIG. 11 refers to the control of a three-phase coil system with three coils 160, as may be used with a three-phase system 150 of the planar drive system 1.

According to the upper diagram of FIG. 11, first voltage pulses 410 are applied to the coil system, and furthermore, the electrical control of the coil system is influenced so that a third electrical current curve 435 occurs. In the region of the first voltage pulses 410, the current follows the first voltage pulses 410, so that the third current curve 435 has a triangular appearance in this region. According to the example shown in FIG. 11, the influencing of the control of the coil system extends over two PWM clock periods, i.e. in this case from time 2*Ts to time 4*Ts, wherein two first voltage pulses 410 are omitted. This process may also be referred to as blanking of the first voltage pulses 410. The effect of the influencing is that no ripple current occurs during the influenced period. Due to an inertia of the coil system, a current flow with a decreasing current amount is still present in the influenced time period, as shown by the third current curve 435.

The lower diagram of FIG. 11 shows conditions when a three-phase coil system or three-phase system 150 is controlled and influenced. The three-phase system 150 is subjected to center-aligned second voltage pulses 421, third voltage pulses 422 and fourth voltage pulses 423 with different pulse widths. Furthermore, an influence on the electrical drive of the three-phase system 150 occurs in such a way that a fourth electrical current curve 436 results therefrom. The fourth current curve 436 relates to one of the three coils 160 of the three-phase system 150. In the region of the second voltage pulses 421, third voltage pulses 422 and fourth voltage pulses 423, i.e. where the associated three drive voltages are not at the same (upper or lower) voltage level, there is an increase in the amount of current and the current follows the drive voltages, so that the fourth current curve 436 has a triangular appearance in this region.

In the lower diagram of FIG. 11, the control and its influencing is performed corresponding to the upper diagram, so that the fourth current curve 436 in the three-phase system 150 coincides with the third current curve 435 in the single-phase coil system. The influencing by blanking is carried out in such a way that a second voltage pulse 421, third voltage pulse 422 and fourth voltage pulse 423 are omitted in the influenced period. As a result, no increase in the current amount and thus no ripple current occurs in the influenced period. Due to the inertia of the coil system, a current flow with decreasing current amount is still present in the influenced period, as shown for the fourth current curve 436. In the case of the two other coils 160 of the three-phase system 150, current curves corresponding to the fourth current curve 436 occur. Here, too, the amount of current is increased in each case if all three drive voltages are not at the same voltage level, and otherwise the amount of current is reduced.

As has been described above, the influencing device 191 shown in FIG. 10 may be controlled by the main controller 500 of the planar drive system 1 as part of the data transmission from the stator 5 to a rotor 200. Based on this, the influencing device 191 may temporarily influence the current control of the three-phase system 150 shown in FIG. 10. In this way, the ripple current in the three-phase system 150, thus the generation of an alternating magnetic field caused by the ripple current, and in this way the induction of an alternating electric voltage in the rotor coil 240 of the relevant rotor 200 may be temporarily (substantially) suppressed.

With reference to the control loop shown in FIG. 10, it is possible that each stator module 10 of the stator 5 has an individual influencing device 191. The influencing device 191 of a stator module 10 may be embodied and used in the manner described above to temporarily interrupt the control signals 301 generated by at least one current controller 170 of the associated stator module 10 and to temporarily cause an influenced operation of at least one output stage device 180, and thus a suppression of the ripple current in at least one three-phase system 150 of the stator module 10. It is also possible that the stator 5 comprises a separate influencing device 191 for each three-phase system 150 and thus each current controller 170 and each output stage device 180. In this embodiment, each stator module 10 may comprise twenty-four influencing devices 191 via which the current control of one three-phase system 150 at a time may be influenced.

As has been described above, a plurality of three-phase systems 150 of the stator 5, which may also be components of a plurality of adjacent stator modules 10, may be energized simultaneously. In this respect, it is possible to temporarily influence the current control of one or a plurality of energized three-phase systems 150 for the purpose of transferring data from the stator 5 to a rotor 200 via one or a plurality of influencing devices 191. This may be initiated and controlled by the main controller 500 by the main controller transmitting appropriate data control signals 321 to one or a plurality of influencing devices 191. When influencing the current control of a plurality of energized three-phase systems 150, the influencing may be synchronized in time with each other. During operation of one or a plurality of influencing devices 191, the ripple current in one or a plurality of three-phase systems 150 may be temporarily suppressed. In a corresponding manner, the generation of an alternating magnetic field associated with the ripple current, and thus the induction of an alternating electrical voltage in the rotor coil 240 of a rotor 200, may be temporarily (substantially) suppressed. Based thereon, corresponding data signals may be transmitted from the stator 5 to the respective rotor 200.

With regard to the data transmission from the stator 5 to the rotors 200, the rotors 200 of the planar drive system 1 are embodied to measure of the alternating voltage induced in the rotor coil 240 in order to detect, based thereon, the intermittent influencing of the current control of at least one three-phase system 150 of the stator 5. Furthermore, an evaluation is carried out in order to determine data signals which may be generated by the stator 5 as a result of the intermittent or pulse-wise influencing of the current control. The influencing may cause a change with respect to the alternating voltage induced in the rotor coil 240 of a rotor 200.

For the rotor 200, the embodiment shown in FIG. 8 may be used in this context. For the purpose of voltage measurement and evaluation, the components shown in FIG. 8, i.e. the voltage measuring device 283 connected to the rotor coil 240 and the controller 280, may be used. Here, the voltage measuring device 283 is used to measure the alternating voltage induced in the rotor coil 240. The voltage measuring device 283 is connected to the controller 280 so that corresponding measuring signals of the alternating voltage may be transmitted to the controller 280. By evaluating the measuring signals, the controller 280 may detect the change caused by the temporary influence of the current flowing from at least one three-phase system 150 of the stator 5 with respect to the induction voltage, and based thereon determine the data signals generated by the stator 5.

In the identification method described above and illustrated in FIGS. 7A and 7B, in addition to providing position information of the rotors 200, it is intended to activate the rotors 200 in such a way that the rotors 200 consecutively transmit their respective rotor identifier to the stator 5. To activate the rotors 200, an alternating magnetic field is generated consecutively via the stator 5 at those positions at which the rotors 200 are located, which activates the rotors 200 to transmit the rotor identifier and thereby induces an alternating voltage in the rotor coil 240 of the rotors 200.

With regard to the activation of the rotors 200 for transmitting the rotor identifier, an influenced energization of three-phase systems 150 of the stator 5 at the positions of the rotors 200 may be carried out in accordance with the manner described above. This may be carried out in such a way that the activating alternating magnetic field generated in each case at the position of a rotor 200 and the alternating voltage induced therewith in the rotor coil 240 of the relevant rotor 200 are modulated in a manner reproducing an activation command.

Such a process may be controlled by the main controller 500 of the planar drive system 1, in that the main controller 500 sequentially controls one or a plurality of influencing devices 191 of the stator 5, respectively, and transmits data control signals 321 relating to the activation command to the influencing device(s) 191 (cf. FIG. 10). By measuring the induced alternating voltage and evaluating the measured induced alternating voltage, which may be done via the voltage measuring device 283 and the controller 280 of the rotors 200, respectively (cf. FIG. 8), the activation command may be detected by the controller 280 of the rotors 200. In this context, the controllers 280 of the rotors may be embodied to initiate the transmission of the rotor identifier, which is carried out according to FIG. 8 by correspondingly accessing the switching device 271 of the respective rotor 200, provided that the controllers 280 detect the receipt of the activation command.

With respect to identifying of the rotors 200 of the planar drive system 1, an activating alternating magnetic field may be generated consecutively at the positions of the rotors 200 for the transmission of the activation command (first arrow 610, second step 602 and fourth step 604 in FIGS. 7A and 7B) by applying a correspondingly influenced current to three-phase systems 150 of the stator 5 at the positions of the rotors 200. Hereby it may be achieved that the controllers 280 of the rotors 200 consecutively initiate the transmission of the rotor identifiers to the stator 5 (second arrow 620, third step 603 and fifth step 605 in FIGS. 7A and 7B), i.e. according to the embodiment shown in FIG. 8 by correspondingly loading the rotor coil 240. Starting from the stator 5, the rotor identifiers, in the form of the evaluation data provided by the evaluating devices 177 of the stator 5 based on the measurement of the summation current 314 of energized three-phase systems 150 (cf. FIG. 9), may be consecutively forwarded to the main controller 500. The main controller 500 may unambiguously link the rotor identifiers which thus consecutively reach the main controller 500 with the position information of the rotors 200.

With reference to the aforementioned embodiment of the identification method, it is again possible that the rotors 200 are held stationary on the stator 5 or attracted to the stator 5 due to the magnetic fields generated by the stator 5 during activation.

Furthermore, it is possible to energize three-phase systems 150 at the positions of the rotors 200 already before (and also after) the transmission of the activation command, in order to e.g. supply the rotors 200 and their controllers 280 with energy on the basis of the alternating voltage induced in the rotor coil 240 in this way. In this embodiment, a corresponding influence is consecutively applied to the energization of three-phase systems 150 of the stator 5 at the positions of the rotors 200 to consecutively generate at the positions of the rotors 200 an alternating magnetic field reproducing the activation command and thereby consecutively transmit the activation command to the rotors 200.

The transmission of an activation command from the stator 5 to the rotors 200 may be considered in a corresponding manner for the embodiment of the rotors 200 shown in FIG. 6, in which the rotors 200 comprise a radio transmission device 250. To this end, in accordance with the embodiment shown in FIG. 8, the rotors 200 may comprise a voltage measuring device 283 for measuring the alternating voltage induced in the rotor coil 240 and transmitting measuring signals to the controller 280. The controller 280 may be adapted to cause the transmission of the rotor identifier, which according to the embodiment shown in FIG. 6 is done by appropriately accessing the radio transmitter 250 of the respective rotor 200 as soon as the controller 280 detects the receipt of an activation command. As described above, the rotor identifier may be transmitted by radio to the stator 5 or to an (external) radio receiver 50, and from there forwarded to the main controller 500.

In the following, further possible embodiments are described, which may be considered for the planar drive system 1 and its components, as well as for a method executable for identifying rotors 200 of the planar drive system 1.

Figure 12:
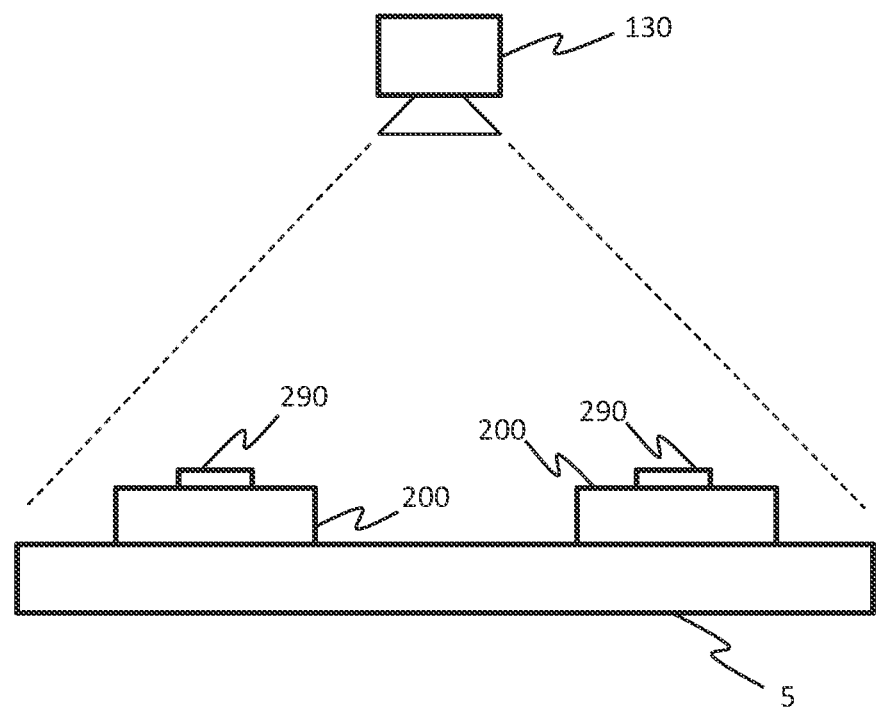
FIGS. 12 and 13 are illustrations of the planar drive system, using a camera.

In a possible variant, the rotor identifiers of the rotors 200 are visually present on the rotors 200. For this purpose, the rotor identifiers may be present in the form of optically visible signs 290 on the rotors 200, as shown in FIG. 12. The signs 290 may e.g. be rotor identifiers printed on the rotors 200. Alternatively, the signs 290 may e.g. be realized in the form of stickers reproducing the rotor identifiers and arranged on the rotors 200. The visible rotor identifiers may further be e.g. in the form of a machine-readable identifier, a QR code, a bar code, or even plain text.

If such signs 290 on the rotors 200 reflecting the rotor identifiers are used, the planar drive system 1 may have a camera 130, as shown in FIG. 12. Via the camera 130, the signs 290 and thus the rotor identifiers of the rotors 200 may be read out and made available to the main controller 500 of the planar drive system 1 (cf. FIG. 1). For this purpose, the main controller 500 and the camera 130 are connected to each other in such a way that data communication between the main controller 500 and the camera 130 is possible, and corresponding image data may be transmitted from the camera 130 to the main controller 500. As indicated in FIG. 12, the camera 130 may be arranged in such a way that all the rotors 200 of the planar drive system 1 may be located in the image area of the camera 130, and thus all the rotors 200 and their signs 290 may be captured via the camera 130.

The camera 130 may further be used, as appropriate, to provide position information of the rotors 200 to the main controller 500. The camera-based position information may be combined or matched by the main controller 500 with position information that may be provided by the position detecting system comprising magnetic field sensors 115 (see FIG. 6). In order to identify the rotors 200, the main controller 500 may combine the position information and the rotor identifiers of the rotors 200 provided using the camera 130.

Figure 13:
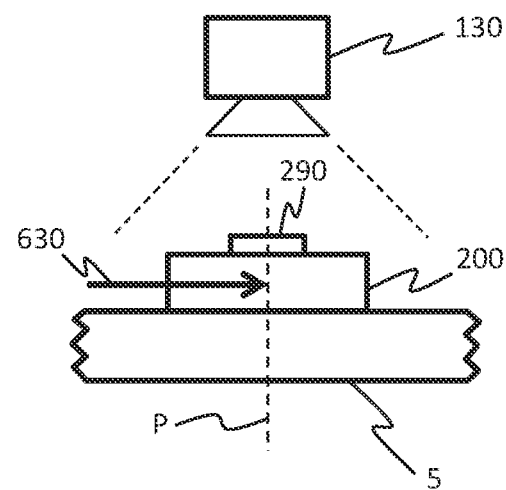
Figure 14:
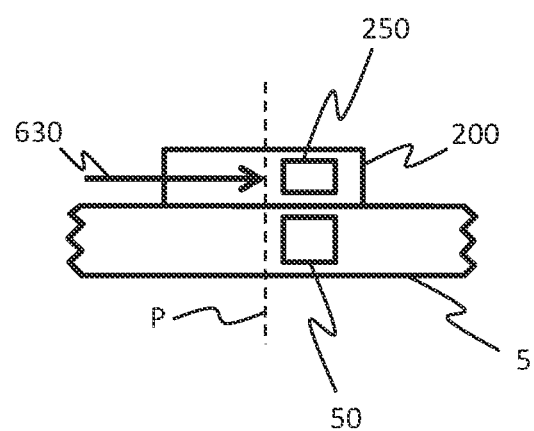
FIGS. 14 and 15 are illustrations of the planar drive system, using radio transmission and NFC transmission.
Figure 15:
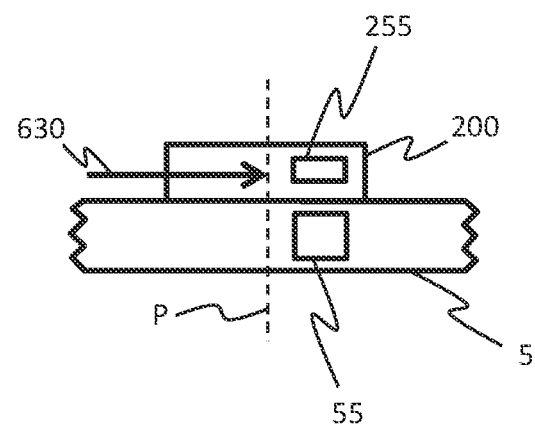

With regard to the provision of the position information and the rotor identifiers of the rotors 200, it may also be considered that the rotors 200 are not located at different positions on the stator 5. Instead, the rotors 200 may be moved one by one by driving the rotors 200 to a predetermined readout position P on the stator 5, at each of which the rotor identifier of a rotor 200 is provided, as will be described below with reference to FIGS. 13, 14 and 15. In FIGS. 13, 14 and 15, the movement of the respective rotor 200 shown to the readout position P is indicated via a third arrow 630. Subsequently, the rotors 200 may be moved away from the readout position P again. This may be controlled by the main controller 500 by appropriately driving the stator 5 to energize three-phase systems 150 of the stator 5. In this embodiment, the predetermined readout position P may serve as the readout station of the stator 5. In this way, the same position information may be provided for each of the rotors 200 in the identification process, which may be linked to the rotor identifiers of the rotors 200 consecutively provided at the predetermined readout position P, respectively, by the main controller 500.

Again, as shown in FIG. 13, a camera 130 connected to the main controller 500 may be used to provide the rotor identifiers. The camera 130 may be located in the area of the predetermined readout position P, so that the rotors 200 may be moved under the camera 130 individually for reading out the signs 290 and thus the rotor identifiers of the rotors 200, in order to make the rotor identifiers available to the main controller 500.

FIG. 14 shows a further embodiment for a readout station. Here, at the predetermined readout position P, to which the rotors 200 are moved one after the other, a defined radio transmission area is provided, at which the rotors 200 transmit the respective rotor identifier, in accordance with the embodiment described above with reference to FIG. 6, to a radio receiver 50 via radio transmission. As shown in FIG. 14, the stator 5 may comprise the radio receiver 50. Alternatively, the radio receiver 50 may be an external radio receiver 50 separate from the stator 5, which is connected to the main controller 500 and may be located outside of the stator 5. The radio receiver 50 may be present in the region of the predetermined readout position P, or at another location. The rotors 200 have a radio transmitter 250 which may be controlled by a controller 280 of the rotors 200 in order to transmit the rotor identifier stored in a memory device 281 to the stator 5 or to the radio receiver 50, and from there to the main controller 500 (cf. FIG. 6).

FIG. 15 illustrates a further embodiment for a readout station. Here, an NFC reader 55 is present in the area of the predetermined readout position P, to which the rotors 200 are moved one after the other. As shown in FIG. 15, the stator may comprise the NFC reading device 55. Alternatively, the NFC reader 55 may be an external NFC reader 55 separate from the stator 5, which is connected to the main controller 500 and may be located outside the stator 5. The rotors 200 comprise an NFC transponder 255 in which the respective rotor identifier is stored. The NFC transponder 255 may have a corresponding memory device for this purpose. Provided that the rotors 200 are moved to the predetermined readout position P, a readout of the rotor identifier takes place using the NFC reading device 55, which may subsequently be forwarded to the main controller 500.

The above-described embodiments may further be modified to provide a plurality of predetermined readout positions P or spatially distributed readout stations on the stator 5 to which the rotors 200 may be driven by driving them to provide the respective rotor identifier at these locations. This may also be controlled by the main controller 500 by appropriately driving the stator 5 to energize three-phase systems 150 of the stator 5. In this way, different position information of the rotors 200 may be provided as part of the identification process. The provision of the rotor identifiers at the different predetermined readout positions P or readout stations may be carried out in accordance with the embodiments described above by installing a camera 130 at each of these positions for reading out the optically visible rotor identifiers (cf. FIG. 13) and forwarding them to the main controller 500, or a radio receiver 50 (cf. FIG. 14) or an NFC reading device 55 (cf. FIG. 15) is present at each of these locations, so that the rotor identifiers may be transmitted from the rotors 200 to the respective radio receivers 50 or NFC reading devices 55, and then to the main controller 500.

Figure 16:
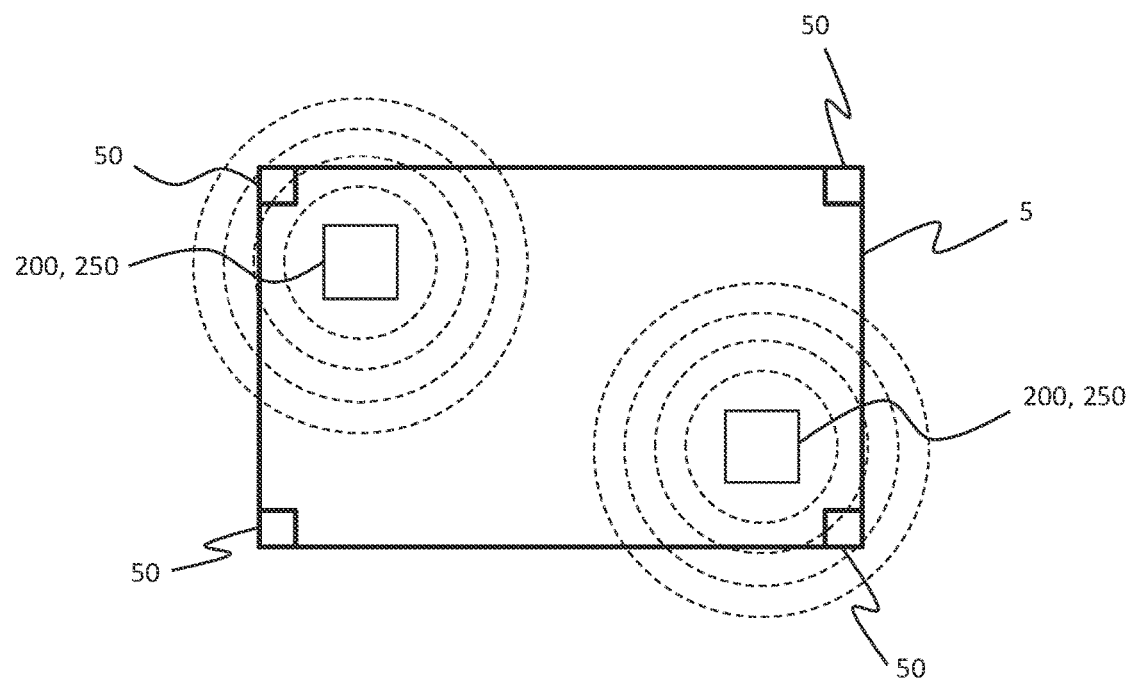
FIGS. 16 and 17 show further illustrations of the planar drive system using radio transmission.

With regard to transmitting the rotor identifiers via radio transmission, the following embodiments are further conceivable. For example, a plurality of radio receivers 50 may be used. As shown in FIG. 16, the plurality of radio receivers 50 may be arranged at the edge or corners of the stator 5. Furthermore, the plurality of radio receivers 50 may be components of the stator 5 or external radio receivers 50. According to the embodiment shown in FIG. 6, the rotors 200 may comprise a radio transmitter 250 for transmitting or communicating the respective rotor identifier to the radio receivers 50. The radio transmitters 250 may be controlled by controllers 280 of the rotors 200. On the basis of different signal strengths of radio signals, which may be emitted by the radio transmitters 250 of the rotors 200 when transmitting the rotor identifiers, or using a radio direction finding via triangulation, the positions of the rotors 200 may be detected and position information of the rotors 200 may be provided. This may be done within the framework of a corresponding evaluation, which may be performed by the main controller 500. The main controller 500 may further link the position information with the rotor identifiers transmitted by radio to the stator 5, and forwarded by the stator 5 to the main controller 500.

Figure 17:
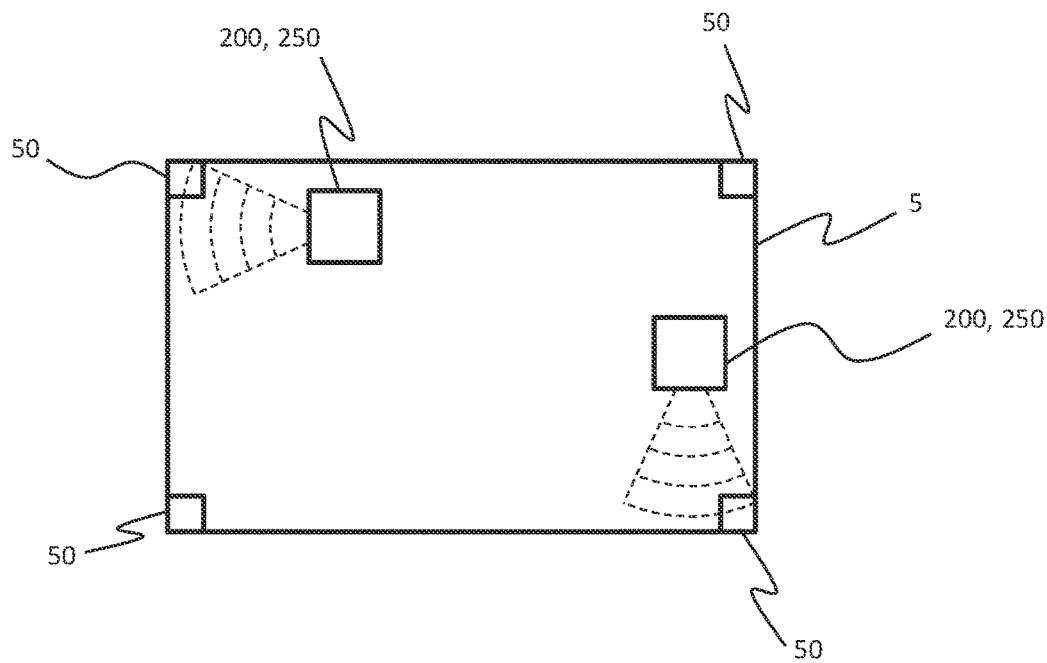

In a corresponding manner, the use of directional radio may be considered. In this context, a plurality of radio receivers 50, possibly arranged at the edge or at the corners of the stator 5, may also be used and the radio transmitters 250 of the rotors 200 may be embodied to radiate radio signals in different directions, as shown in FIG. 17. In this way, too, different signal strengths of the radio signals may be used to detect a position and, by carrying out a corresponding evaluation by the main controller 500, to provide position information of the rotors 200, which may be linked to the rotor identifiers transmitted by radio.

With reference to the embodiments described on the basis of FIGS. 16 and 17, it is possible that the transmission of the rotor identifiers by the radio transmitters 250 of the rotors 200 takes place consecutively or simultaneously. Furthermore, the methods described above (radio direction finding, directional radio) may be used to roughly detect the positions of the rotors. In addition, further position information of the rotors 200 may be used, which may be provided via the position detecting system comprising magnetic field sensors 115 (cf. FIG. 6). Here, the rough position information may be combined or matched by the main controller 500 with position information that may be provided via the position detecting system.

In embodiments in which rotor identifiers of the rotors 200 are provided via radio transmission, as described with reference to FIGS. 14, 16, and 17, activation of the rotors 200 to transmit the rotor identifiers may be carried out in accordance with the previously described embodiments. In this sense, an alternating magnetic field activating the rotors 200 may be generated at the positions of the rotors 200, thereby inducing an alternating voltage in the rotor coil 240 of the rotors 200. By generating the alternating magnetic field and inducing the alternating voltage, the energization of controllers 280 of the rotors 200 may be initiated, or alternatively an activation command to the rotors 200 may be transmitted, whereupon the controllers 280 may cause the transmission of rotor identifiers.

Figure 18:
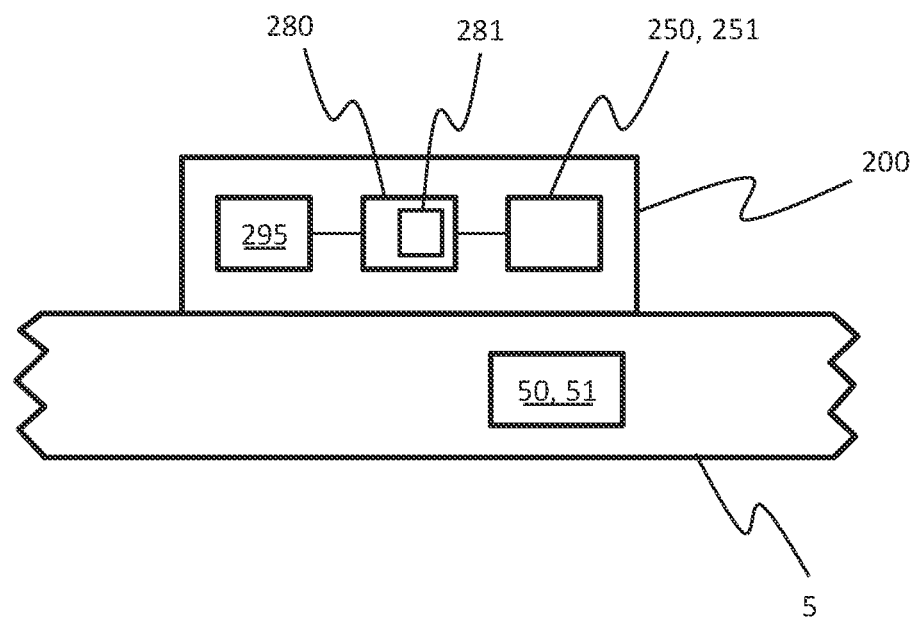
FIG. 18 is a depiction of the planar drive system with a rotor having an energy storage device.

Another variant is to perform the activation of the rotor 200 for sending out the rotor identifier by radio also via radio transmission. As shown in FIG. 18, the stator 5 may have a stator transceiver 51 for this purpose, by which radio signals may be transmitted and received. When receiving, the stator transceiver 51 functions as a radio receiver 50. As shown in FIG. 18 with reference to a rotor 200, the rotors 200 may have a rotor transceiver 251 with which radio signals may also be transmitted and received. When transmitting, the rotor transceiver 251 serves as a radio transmitter 250. Via the stator transceiver 51, an activation command may be transmitted by radio from the stator 5 to a plurality of or all of the rotors 200, or to each of the rotors 200 in turn, in order to activate them for transmission of the rotor identifier, also by radio. The rotor transceiver 251 of a rotor 200 may be controlled by a controller 280, as indicated in FIG. 18. The controller 280 may be embodied to detect an activation command transmitted by radio, and based thereon, to control the rotor transceiver 251 to transmit the rotor identifier accordingly. The rotor identifier may be stored in a memory device 281.

With reference to the aforementioned embodiment, the use of a short-range radio transmission technique such as NFC may be considered. Furthermore, in contrast to the embodiment shown in FIG. 18, an external radio transceiver separate from the stator 5 may be used, which may be connected to the main controller 500. Here, an activation command may be transmitted by radio from the external radio transceiver to the rotors 200, and the rotor identifiers may also be transmitted by radio from the rotors 200 to the external radio transceiver, and from this further on to the main controller 500.

The rotors 200 of the planar drive system 1 may further comprise an electrical energy storage device 295, as also shown in FIG. 18. The energy storage device 295 may e.g. be a battery. Via the energy storage 295, the energy for transmitting the rotor identifier may be made available, and rotor components such as the controller 280 and the radio transmitter 250 or the rotor transceiver 251 may be electrically supplied. The energy storage device 295 of a rotor 200 may further be used to electrically supply at least one further device, which may be arranged on the rotor 200 and/or be a component of the rotor 200. This may e.g. be an actuator system.

In an embodiment of rotors 200 having an energy storage device 295, the use of a rotor coil 240 may be omitted, and rotors 200 may thus be formed without a rotor coil 240. Furthermore, the use of an energy storage device 295 may also be applied to above-described embodiments of rotors 200, such as those shown in FIGS. 6, 8, 14, 16, and 17, to electrically power rotor components such as a controller 280, a radio transmitter 250, etc.

Further variants with respect to the rotors 200 comprise using rotors 200 with a plurality of rotor coils 240 e.g. arranged laterally adjacent to one another. The plurality of rotor coils 240 may e.g. be arranged on an underside of the rotor 200 or in spacers 205 of the rotor 200 (cf. FIG. 3). The plurality of rotor coils 240 may be interconnected. An alternating voltage induced in the plurality of rotor coils 240 may also be used to supply power, and may be rectified for this purpose using a rectifier 260. A coil portion of the plurality of rotor coils 240 may be short-circuited for carrying out a load modulation.

Figure 19:
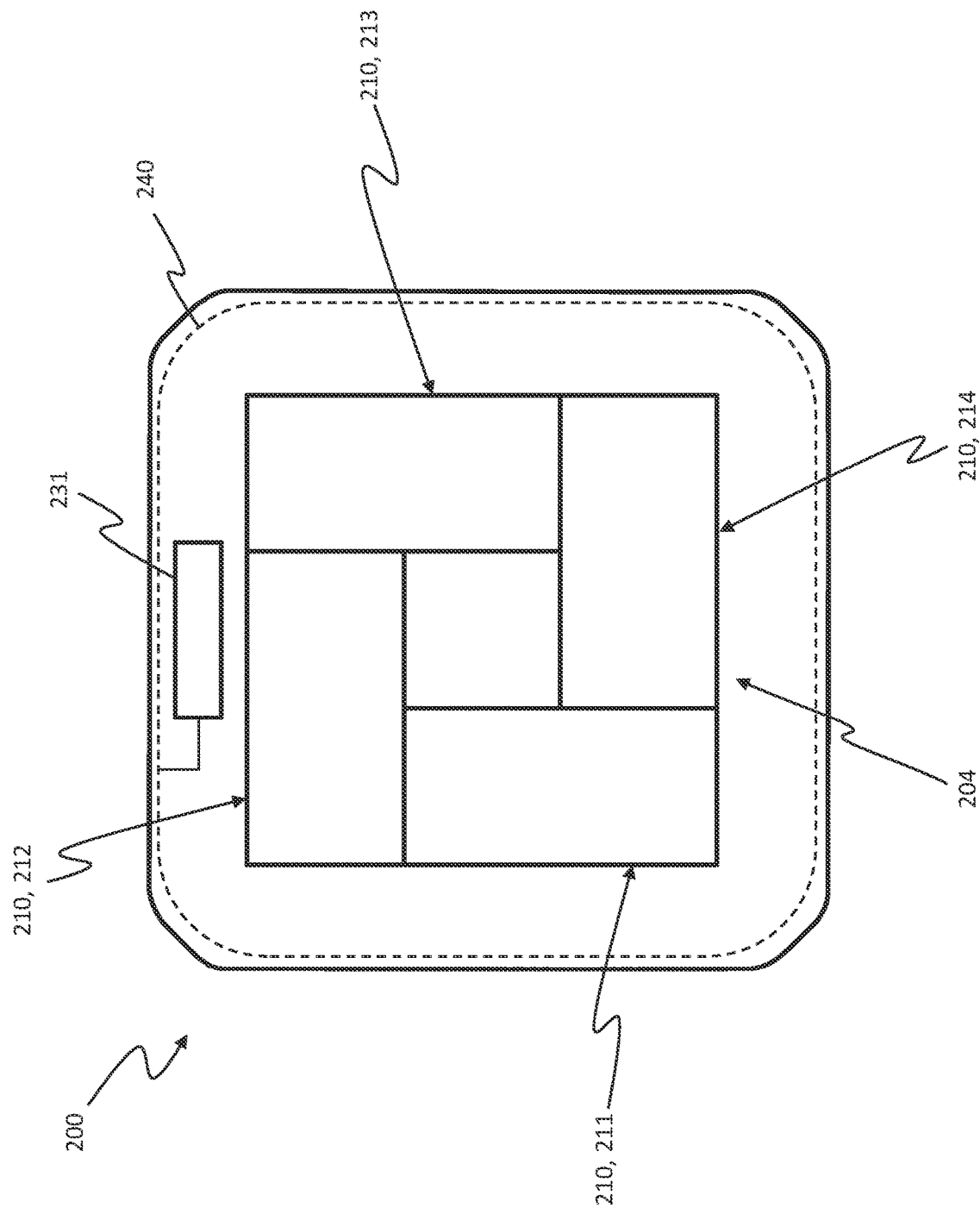
FIG. 19 is a depiction of a further embodiment of a rotor, which has a rotor coil in the region of lateral outer sides.

FIG. 19 shows another possible embodiment which may be considered for a rotor 200 of the planar drive system 1. The rotor 200 shown in FIG. 19 comprises a rotor coil 240 which may be used for inductive energy transfer and for data transfer between the stator 5 and the rotor 200 as described above. The rotor coil 240 is arranged in an area or installation space of the rotor 200 laterally surrounding the magnet device 204 comprising the four magnet units 210.

The rotor coil 240, which is located in the region of lateral outer sides of the rotor 200, may e.g. be integrated in spacers of the rotor 200. Also, the rotor coil 240 may be realized in the form of a multi-wound wire.

As indicated in FIG. 19, the rotor 200 may further comprise a second printed circuit board 231 at a suitable location. In this context, the rotor 200 may e.g. be embodied in accordance with the embodiment shown in FIG. 6 for transmitting data by radio. Components described on the basis of FIG. 6, such as the rectifier 260, the controller 280 and the radio transmitter 250, may be components of the second printed circuit board 231 and/or arranged on the second printed circuit board 231 in a corresponding manner.

Alternatively, the rotor 200 shown in FIG. 19 may e.g. be embodied for transmitting data via load modulation according to the embodiment shown in FIG. 8. Components described with reference to FIG. 8, such as the rectifier 260, the smoothing capacitor 266, the load resistor 272, the switching device 271, the controller 280 and the voltage measuring device 281, may be components of the second printed circuit board 231 and/or arranged on the second printed circuit board 231 in a corresponding manner. Furthermore, the first coil portion 248 and second coil portion 249 shown in FIG. 8 may be formed by different windings of the rotor coil 240 realized in the form of a wound wire.

With reference to the embodiment described with reference to FIG. 19, the rotor 200 may further be implemented such that the second printed circuit board 231 has a shape surrounding the magnet device 204. In this embodiment, the second printed circuit board 231 may have multiple layers. Furthermore, the rotor coil 240 may be formed by superimposed spiral conductor tracks of the second printed circuit board 231, and the first coil portion 248 and second coil portion 249 shown in FIG. 8 may be formed by different conductor tracks of the printed second circuit board 231.

The magnet device 204 of the rotor 200 may, differing from FIG. 19, also be embodied in such a way that the magnet device 204 does not surround any area or free space. In this way, an embodiment of the rotor 200 with small or smaller dimensions is possible. If a plurality of identical rotors 200 are used in the planar drive system 1 (cf. FIG. 1), more rotors 200 may be used on the stator 5.

The embodiment of the rotor 200 described above and explained with reference to FIG. 19 offers the possibility of transferring a relatively large amount of electrical power from the stator 5 to the rotor 200. In this way, power and data transmission between the stator 5 and the rotor 200 may be favored.

As indicated above, at least one rotor identifier and thus at least one rotor 200 of the planar drive system 1 may be assigned an individualized parameter set, based on which the main controller 500 may perform driving of the respective rotor 200 by driving the stator 5. By identifying the rotors 200, the main controller 500 may assign its associated parameter set to at least one identified rotor 200, and based on the parameter set carry out the driving of the stator 5 for driving the rotor 200.

In this way, it may be taken into account that one or a plurality of rotors 200 of the planar drive system 1 or their magnet devices 204 (cf. FIGS. 3 and 19) may have tolerance deviations due to manufacturing. For such rotors 200, an individualized parameter set may be determined in each case by measuring or calibrating after manufacture. Using the individualized parameter set, the main controller 500 may carry out a more precise control of the driving of the associated rotor 200, i.e., one that at least partially compensates for the tolerance deviation.

In this context, a multi-stage system of parameter sets of the rotors 200 via their rotor identifiers may e.g. be applied. In a first stage, the control of the driving of the rotors 200 performed with the main controller 500 may be carried out using generalized parameters which are the same for all rotors 200.

In a second stage, the control of the driving of a single, a plurality of or all rotors 200 of the planar drive system 1 may be carried out on the basis of individualized parameter sets which have been determined in the curve of the manufacturing of the rotors 200. Such parameter sets may e.g. be downloaded from a server with the respective rotor identifiers. This allows for more precise control of the associated rotors 200 in the planar drive system 1.

The individualized parameter sets may also be stored in the rotors 200 themselves, e.g. in a memory device 281 thereof (cf. e.g. FIGS. 6 and 8). Here, the individualized parameter sets may be transmitted by methods described above, e.g. by load modulation to the stator 5 or by radio to (at least) a radio receiver 50 of the stator 5 or (at least) an external radio receiver 50, and from there to the main controller 500. This may e.g. be done during an initial start-up of the planar drive system 1.

In this context, it is further possible for a user of the planar drive system 1 to e.g. acquire different rotors 200. In this context, a first type of rotors 200 may be operated exclusively using generalized parameter sets. A second type of rotors 200, which have been measured more precisely, may be operated on the basis of generalized parameter sets or on the basis of individualized, and thus more precise, parameter sets.

In a third stage, even more precise individualized parameter sets may be used to control a single, a plurality of or all of the rotors 200 of the planar drive system 1. Such parameter sets may e.g. have been obtained by a measurement over a longer period of time or with a higher resolution.

Apart from this, the rotor identifiers of the rotor 200 may also be used for another purpose. For example, it is possible to track the product or the rotor 200 from manufacture to use or service, which may be done using the rotor identifiers.

The used rotor identifiers may be system-wide rotor identifiers, which are only related to the considered planar drive system 1 and its rotor 200. For a further planar drive system, the same system-wide rotor identifiers, which are again related to the respective planar drive system, may be used.

The rotor identifiers used may also be global rotor identifiers, which are assigned only once for each rotor 200 (even from different systems) and are therefore unique.

Furthermore, both system-wide rotor identifier and global rotor identifier may be associated with the rotors 200. Here, the system-wide rotor identifiers may be used in the usual operation of the planar drive system 1 to uniquely assign and recognize the rotors 200 by performing the identification. The global rotor identifiers, on the other hand, may e.g. be used to perform tracking of rotors 200, or to provide individualized parameter sets for more accurate control of rotors 200. Furthermore, a combination of global rotor identifier and system-wide rotor identifier may be carried out to provide individualized parameter sets for rotors 200 of the planar drive system 1 to the main controller 500, which may be used by the main controller 500 to perform more precise control of the driving of the rotors 200.

Within the framework of identifying the rotors 200, system-wide rotor identifiers of the rotors 200 may be provided. It is also possible to provide global rotor identifiers, or to provide system-wide rotor identifiers and global rotor identifiers of the rotors 200.

Although the invention has been further illustrated and described in detail by embodiments, the invention is not limited by the disclosed examples and other variations may be derived therefrom by those skilled in the art without departing from the protective scope of the invention.

TABLE 1

List of reference numerals: 1-295

| | | |
|---|---|---|
| 1 planar drive system | 157 star point | 214 fourth magnet unit |
| 5 stator | 160 coil | 216 rotor magnet |
| 10 stator module | 165 first coil | 230 first printed circuit board |
| 11 stator surface | 166 second coil | 231 second printed circuit board |
| 12 first direction | 167 third coil | 240 rotor coil |
| 14 second direction | 170 current control-loop device | 248 first coil portion |
| 15 third direction | 171 intermediate circuit | 249 second coil portion |
| 16 connection line | 172 current measuring device | 250 radio transmitter |
| 18 module housing | 175 summation current measuring device | 251 rotor transceiver |
| 21 outer edge | 177 evaluating device | 255 NFC transponder |
| 32 module underside | 180 output stage device | 260 rectifier |
| 33 side surfaces | 190 module controller | 261 first diode |
| 50 radio receiver | 191 influencing device | 262 second diode |
| 51 stator transceiver | 192 data controller | 263 third diode |
| 55 NFC reader | 193 interrupting device | 264 fourth diode |
| 100 stator assembly | 200 rotor | 266 smoothing capacitor |
| 101 first stator sector | 201 first rotor | 271 switching device |
| 102 second stator sector | 202 second rotor | 272 load resistor |
| 103 third stator sector | 204 magnet device | 280 controller |
| 104 fourth stator sector | 205 spacer | 281 memory device |
| 106 stator sector | 206 first rotor direction | 283 voltage measuring device |
| 110 processing device | 208 second rotor direction | 286 first connection |
| 115 magnetic field sensor | 210 magnet unit | 287 second connection |
| 125 stator conductor | 211 first magnet unit | 290 sign |
| 130 camera | 212 second magnet unit | 295 energy storage |
| 150 three-phase system | 213 third magnet unit | |

TABLE 2

List of reference numerals: 300-630

| | | |
|---|---|---|
| 300 target current values | 500 main controller | M1 first rotor identifier |
| 301 control signals | 601 first step | M2 second rotor identifier |
| 302 modified control signals | 602 second step | P readout position |
| 304 actual current values | 603 third step | P1 first position |
| 314 summation current | 604 fourth step | P2 second position |
| 321 data control signals | 605 fifth step | T time |
| 410 first voltage pulse | 606 sixth step | Ton pulse duration |
| 421 second voltage pulse | 610 first arrow | Toff timeout duration |
| 422 third voltage pulse | 620 second arrow | Ts period duration |
| 423 fourth voltage pulse | 630 third arrow | U first phase |
| 424 voltage pulse | | V second phase |
| 430 first current curve | | W third phase |
| 431 second current curve | | |
| 435 third current curve | | |
| 436 fourth current curve | | |
| 470 current measuring time point | | |

The invention claimed is:

1. A method for operating a planar drive system,
   wherein the planar drive system comprises a stator, a plurality of rotors and a main controller,
   wherein the stator comprises a plurality of energizable stator conductors,
   wherein an energizing of the stator conductors of the stator is controllable via the main controller,
   wherein each rotor comprises a magnet device having at least one rotor magnet, wherein a magnetic interaction is producible between the energized stator conductors of the stator and the magnet devices of the rotors in order to drive the rotors, wherein at least one individual rotor identifier is assigned to each rotor, and wherein an identification of the rotors is carried out by providing position information of the rotors and rotor identifiers of the rotors and linking the provided position information of the rotors to the provided rotor identifiers of the rotors via the main controller.

2. The method according to claim 1, wherein each rotor is configured to transmit the rotor identifier to provide the rotor identifier, and wherein for the identification the rotors are activated such that the rotors consecutively transmit the rotor identifier.

3. The method according to claim 1, wherein each rotor is configured to transmit the rotor identifier to provide the rotor identifier, wherein the stator is configured to carry out the energizing of the stator conductors such that an alternating magnetic field is generated via the energized stator conductors, wherein each rotor comprises at least one rotor coil in which an alternating voltage is inducible due to the alternating magnetic field, and wherein for the identification, an alternating magnetic field activating the rotors for transmitting the rotor identifier is generated in a consecutive manner via the stator at those positions at which the rotors are located, and an alternating voltage is thereby induced in the at least one rotor coil of the rotors, so that the rotors transmit the rotor identifier in a consecutive manner.

4. The method according to claim 3, wherein each rotor comprises a controller for controlling the transmission of the rotor identifier, wherein the controller of each rotor is supplied with energy by the alternating voltage induced in the at least one rotor coil, and wherein, for each rotor, energy supply to the controller is initiated by generating the activating alternating magnetic field and the alternating voltage thereby induced in the at least one rotor coil, whereupon the controller initiates the transmission of the rotor identifier.

5. The method according to claim 3, wherein each rotor comprises a controller for controlling the transmission of the rotor identifier, and wherein, for each rotor, an activation command is transmitted to the rotor by generating the activating alternating magnetic field and the alternating voltage thereby induced in the at least one rotor coil, whereupon the controller initiates the transmission of the rotor identifier.

6. The method according to claim 1, wherein the stator is configured to carry out the energizing of the stator conductors such that an alternating magnetic field is generated via the energized stator conductors, wherein each rotor comprises at least one rotor coil in which an alternating voltage is inducible due to the alternating magnetic field, wherein each rotor is configured to transmit the rotor identifier to the stator to provide the rotor identifier, and wherein each rotor is configured to perform the transmission of the rotor identifier to the stator by temporarily loading the at least one rotor coil in order to thereby temporarily cause an increased current consumption of the energized stator conductors of the stator.

7. The method according to claim 1, wherein each rotor is configured to transmit the rotor identifier by radio transmission to provide the rotor identifier.

8. The method according to claim 1, wherein the providing of position information of the rotors is carried out using a position detecting system of the planar drive system comprising a plurality of magnetic field sensors.

9. The method according to claim 1, wherein each rotor comprises a memory device in which the rotor identifier is stored.

10. The method according to claim 1, wherein each rotor is configured to transmit the rotor identifier to provide the rotor identifier, wherein the stator is configured to carry out the energizing of the stator conductors such that an alternating magnetic field is generated via the energized stator conductors, wherein each rotor comprises at least one rotor coil in which an alternating voltage is inducible due to the alternating magnetic field, and wherein for the identification, using the provided position information of the rotors, an alternating magnetic field activating the rotors for transmitting the rotor identifier is generated in a consecutive manner by energizing the stator conductors of the stator at those positions at which the rotors are located, and an alternating voltage is thereby induced in the at least one rotor coil of the rotors, so that the rotors transmit the rotor identifier in a consecutive manner.

11. A planar drive system comprising:

a stator, a plurality of rotors, and a main controller;

wherein the stator comprises a plurality of energizable stator conductors, wherein the main controller is configured to control an energizing of the stator conductors of the stator, wherein each rotor comprises a magnet device having at least one rotor magnet, wherein a magnetic interaction is producible between the energized stator conductors of the stator and the magnet devices of the rotors in order to drive the rotors, wherein at least one individual rotor identifier is assigned to each rotor, and wherein the planar drive system is configured to carry out an identification of the rotors by providing position information of the rotors and rotor identifiers of the rotors and linking the provided position information of the rotors to the provided rotor identifiers of the rotors via the main controller.

12. The planar drive system according to claim 11, wherein each rotor is configured to transmit the rotor identifier to provide the rotor identifier, wherein the stator is configured to carry out the energizing of the stator conductors such that an alternating magnetic field is generated via the energized stator conductors, wherein each rotor comprises at least one rotor coil in which an alternating voltage is inducible due to the alternating magnetic field, and wherein the planar drive system is configured, for the identification using the provided position information of the rotors, to consecutively generate an alternating magnetic field activating the rotors for transmitting the rotor identifier by energizing the stator conductors of the stator at those positions at which the rotors are located, and thereby to induce an alternating voltage in the at least one rotor coil of the rotors, so that the rotors transmit the rotor identifier in a consecutive manner.

13. The planar drive system according to claim 12,
wherein each rotor comprises a controller for controlling the transmission of the rotor identifier,
wherein the controller of each rotor is supplied with energy by the alternating voltage induced in the at least one rotor coil, and
wherein, for each rotor, energy supply to the controller is initiated by generating the activating alternating magnetic field and the alternating voltage thereby induced in the at least one rotor coil,
whereupon the controller initiates the transmission of the rotor identifier.

14. The planar drive system according to claim 12,
wherein each rotor comprises a controller for controlling the transmission of the rotor identifier, and
wherein, for each rotor, an activation command is transmitted to the rotor by generating the activating alternating magnetic field and the alternating voltage thereby induced in the at least one rotor coil,
whereupon the controller initiates the transmission of the rotor identifier.

15. The planar drive system according to claim 11,
wherein the stator is configured to carry out the energizing of the stator conductors such that an alternating magnetic field is generated via the energized stator conductors,
wherein each rotor comprises at least one rotor coil in which an alternating voltage is inducible due to the alternating magnetic field,
wherein each rotor is configured to transmit the rotor identifier to the stator to provide the rotor identifier, and
wherein each rotor is configured to perform the transmission of the rotor identifier to the stator by temporarily loading the at least one rotor coil in order to thereby temporarily cause an increased current consumption of the energized stator conductors of the stator.

16. The planar drive system according to claim 11, wherein each rotor is configured to transmit the rotor identifier by radio transmission to provide the rotor identifier.

17. The planar drive system according to claim 11,
wherein the planar drive system comprises a position detecting system for providing the position information of the rotors, and
wherein the position detecting system comprises a plurality of magnetic field sensors.

18. The planar drive system according to claim 11, wherein each rotor comprises a memory device for storing the rotor identifier.

19. A planar drive system comprising:
a stator, and
a plurality of rotors;
wherein the stator comprises a plurality of energizable stator conductors,
wherein each rotor comprises a magnet device having at least one rotor magnet,
wherein a magnetic interaction is producible between energized stator conductors of the stator and the magnet devices of the rotors in order to drive the rotors,
wherein the stator is configured to carry out an energizing of the stator conductors such that an alternating magnetic field is generated via the energized stator conductors,
wherein each rotor comprises at least one rotor coil in which an alternating voltage is inducible due to the alternating magnetic field,
wherein at least one individual rotor identifier is assigned to each rotor,
wherein each rotor is configured to transmit the rotor identifier to provide the rotor identifier,
wherein the planar drive system is configured to carry out an identification of the rotors by providing position information of the rotors and rotor identifiers of the rotors and linking the provided position information of the rotors to the provided rotor identifiers of the rotors, and
wherein the planar drive system is further configured, for the identification using the provided position information of the rotors, to consecutively generate an alternating magnetic field activating the rotors for transmitting the rotor identifier by energizing the stator conductors of the stator at those positions at which the rotors are located, and thereby to induce an alternating voltage in the at least one rotor coil of the rotors, so that the rotors transmit the rotor identifier in a consecutive manner.

* * * * *